US005532783A

United States Patent [19]

Kusaka

[11] Patent Number: 5,532,783
[45] Date of Patent: Jul. 2, 1996

[54] APPARATUS AND METHOD FOR ADJUSTING THE FOCUS OF A CAMERA DURING SCANNING DRIVE AND NON-SCANNING DRIVE OF A PHOTOGRAPHIC LENS

[75] Inventor: Yosuke Kusaka, Yokohama, Japan

[73] Assignee: Nikon Corporation, Tokyo, Japan

[21] Appl. No.: 348,145

[22] Filed: Nov. 23, 1994

[30] Foreign Application Priority Data

Nov. 24, 1993 [JP] Japan ..................................... 5-293315
Dec. 22, 1993 [JP] Japan ..................................... 5-324394

[51] Int. Cl.$^6$ ................................................. G03B 13/36
[52] U.S. Cl. ................................................................ 354/402
[58] Field of Search ...................................... 354/402, 403, 354/406, 407, 408; 250/201.2, 201.7, 201.8

[56] References Cited

U.S. PATENT DOCUMENTS

| | | | |
|---|---|---|---|
| 4,831,403 | 5/1989 | Ishida et al. | 354/402 |
| 4,949,116 | 8/1990 | Karasaki et al. | 354/408 |
| 4,969,006 | 11/1990 | Ishibashi et al. | 354/402 |
| 4,992,819 | 2/1991 | Ohtaka et al. | 354/408 |
| 5,126,777 | 6/1992 | Akashi et al. | 354/402 |

*Primary Examiner*—W. B. Perkey

[57] ABSTRACT

A camera which selects a specific image sensor when the photographic lens is scanning, to reduce the focus detection time during scanning. The camera includes first and second image sensors and a photographic lens. Each image sensor receives light passing through the photographic lens, forms a respective image of the subject to be photographed, and produces a sensor output which corresponds to the luminous intensity distribution of the received light. The second image sensor has a higher sensitivity than the first image sensor. A control unit (a) determines whether focus detection is possible; (b) causes the photographic lens to scan when focus detection is not possible; (c) performs focus detection based on the output of the second image sensor when the photographic lens is scanning. Additional embodiments use only one image sensor and amplify the image sensor output during scanning. Moreover, the output of the image sensor could be thinned, or shifted, during scanning to reduce the focus detection calculation time.

16 Claims, 18 Drawing Sheets

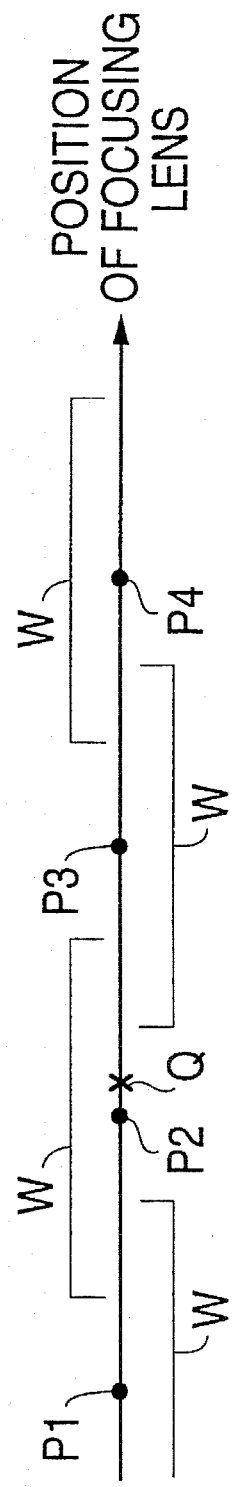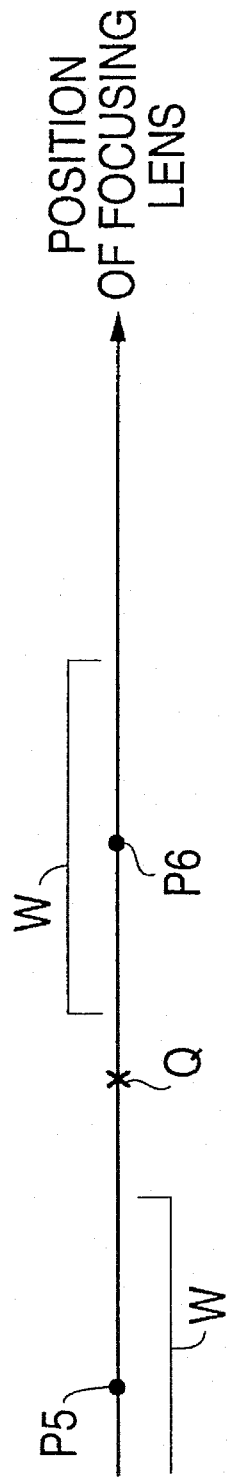

APPARATUS AND METHOD FOR ADJUSTING THE FOCUS OF A CAMERA DURING SCANNING DRIVE AND NON-SCANNING DRIVE OF A PHOTOGRAPHIC LENS

BACKGROUND OF THE INVENTION

1. Field of the Invention

The present invention relates to a method and apparatus for adjusting the focus in a camera and, more particularly, to a method and apparatus for adjusting the focus during scanning drive and non-scanning drive of a photographic lens.

2. Description of the Related Art

Conventional automatic focusing cameras typically use a charge accumulation type image, sensor to receive light of a subject image formed by a focus detection optical system. The image sensor output is analyzed and an amount of defocus of a photographic image plane with respect to a prearranged focus plane of a photographic optical system is calculated, based on the output of the image sensor. Optimum focus is achieved by driving a focusing lens in proportion to the calculated defocus amount.

In this type of conventional camera, a calculation of the defocus amount is impossible when the contrast of the photographic image is insufficiently low. Also, even if the contrast is high, the calculated defocus amount may be unreliable. Therefore, in situations where a calculation of the defocus amount is impossible, or where the calculated defocus amount is judged to be unreliable, the focusing lens is scanned between a close end position and an infinity end position to search for a position of the photographic optical system at which a reliable defocus amount can be calculated. This scanning of the focusing lens is called "scanning drive".

During scanning drive, there are a series of focus detection periods during which a charge is accumulated by the image sensor. A respective defocus amount is calculated for each focus detection period. During the focus detection periods, the amount of movement of the focusing lens of the photographic optical system is large. As a result, the focus position of the subject is missed during the scanning drive. This problem is illustrated in FIGS. 1(A) and 1(B), which are diagrams illustrating the position of a focusing lens of a photographic optical system during scanning drive. In FIGS. 1(A) and 1(B), points P1 through P6 represent positions of the focusing lens in the focus detection period. Moreover, the range W represents the range at which it is possible to detect a defocus amount in each focusing lens position, P1 through P6. The focus position Q represents the focus position of the focusing lens for the subject.

FIG. 1(A) illustrates a situation occurring in scanning drive in which the amount of movement of the focusing lens during the focus detection period is small in comparison with a detectable defocus amount. As illustrated in FIG. 1(A) the ranges W of the detectable defocus amount overlap in each focusing lens position P1, P2, P3 and P4. As a result, the focus position Q can be determined.

In contrast, FIG. 1(B) illustrates a situation occurring in scanning drive in which the amount of movement of the focusing lens during the focus detection period is large in comparison with a detectable defocus amount. As illustrated in FIG. 1(B), the amount of movement of the focusing lens in the focus detection period becomes larger than the detectable defocus amount and the ranges W of the detectable defocus amount do not overlap in each focusing lens position P5 and P6. As a result of a large movement of the focusing lens, it is impossible to determine the focus position Q.

A large movement of the focusing lens can be due to several factors. First, the charge accumulation time of the image sensor becomes long when the luminosity of the subject becomes low. Therefore, the focus detection period becomes long and the amount of movement of the focusing lens in the focus detection period becomes large. Second, if the scanning drive speed of the focusing lens is increased to reduce the scanning drive time, the amount of movement in the focus detection period becomes large. Third, in a multiple autofocus (multi-AF) camera, plural focus detection areas are disposed in the photographic picture plane. The camera performs focus detection for each focus detection area, plural defocus amounts are found and a final defocus amount is set from among these defocus amounts. The focusing lens is moved in accordance with the final defocus amount. Thus, the charge accumulation times, charge transfer times, focus detection calculation times and the time until the final defocus amount is calculated, become long. As a result, the focus detection period becomes long and the amount of movement of the focusing lens in the focus detection period becomes large.

Moreover, when the amount of movement of the focusing lens during the charge accumulation time of the image sensors becomes large, focus detection can be impossible because of movement in the contrast of the subject image. This movement of the contrast causes the contrast to decrease. As a result, the focus position Q cannot be determined.

Also, in a type of autofocus camera, light beams pass through different portions of the exit pupil position of a photographic optical system to form a pair of subject images. An image sensor receives light from the pair of subject images and a correlation calculation is performed to determine the relative shift of the pair of subject images. A focus adjustment state of a focusing lens is determined from the relative shift of the pair of subject images. However, the focus detection calculation time becomes long when the correlation calculation is performed during scanning drive at the same shift amount as in normal focus detection. Accordingly, as illustrated in FIG. I(B), the focus detection calculation time becomes long during scanning drive and the focus position cannot be obtained.

To reduce the focus detection calculation time, an autofocus camera has been proposed in which the focus detection calculation time is shortened by restricting the shift range of the, focus detection correlation calculation according to the direction of scanning of the focusing lens during scanning drive (see, for example, Japanese Laid-Open Patent Publication JP-A-63-172211). However, an adequate reduction of the focus detection calculation time is not sufficiently achieved by such a restriction of the shift range. Moreover, when taking photographs of moving subjects with the camera, a moving subject can move outside the focus detection region and thereby cause focus detection to be impossible. In this situation, focus detection is impossible when the shift range is restricted only in the scanning direction during scanning drive. Even if the subject returns to the focus detection region, focus detection may still be impossible.

SUMMARY OF THE INVENTION

It is therefore an object of the present invention to provide a method and apparatus for reliably detecting and adjusting the focus of a camera during a scanning drive of the photographic optical system.

It is also an object of the present invention to provide a camera which reduces the focus detection calculation time during scanning drive so that, even if high speed scanning is performed, a focus position can be obtained and the subject can be reliably detected even when the subject has moved beyond the focus detection region.

Objects and advantages of the present invention are achieved by providing a camera which performs focus detection to detect a focus position. The camera comprises a photographic lens which is adjustable from a close end position to an infinity end position to obtain a respective focus position corresponding to a subject to be photographed; first and second image sensors, each image sensor receiving light from the subject which passes through the photographic lens, forming a respective image of the subject, and producing a sensor output which corresponds to the luminous intensity distribution of the received light, each image sensor having a specific sensitivity and the sensitivity of the second image sensor being higher than the sensitivity of the first image sensor; and a control unit which (a) determines, based on the sensor output of one of the first and second image sensors, whether focus detection is possible, (b) causes the photographic lens to scan from the close end position to the infinity end position when focus detection is not possible, and (c) performs focus detection based on the output of the second image sensor when the photographic lens is scanning.

Objects are also achieved by providing a camera comprising a photographic lens which is adjustable from a close end position to an infinity end position to obtain a respective focus position corresponding to a subject to be photographed; a plurality of image sensors, each image sensor receiving light from the subject which passes through the photographic lens, forming a respective image of the subject, and producing a sensor output which corresponds to the luminous intensity distribution of the received light; and a control unit which (a) determines, based on the sensor output of at least one image sensor of the plurality of image sensors, whether focus detection is possible, (b) causes the photographic lens to scan from the close end position to the infinity end position when focus detection is not possible, and (c) selects a respective image sensor of the plurality of image sensors and performs focus detection based on the output of the selected image sensor when the photographic lens is scanning.

Moreover, object are achieved by providing a camera comprising a photographic lens which is adjustable from a close end position to an infinity end position to obtain a respective focus position corresponding to a subject to be photographed; an image sensor which receives light from the subject which passes through the photographic lens, forms a respective image of the subject, and produces a sensor output which corresponds to the luminous intensity distribution of the received light; and a control unit which (a) determines, based on the sensor output of the image sensor, whether focus detection is possible, (b) causes the photographic lens to scan from the close end position to the infinity end position when focus detection is not possible, and (c) amplifies the sensor output and performs focus detection based on the amplified sensor output when the photographic lens is scanning.

Objects are further achieved by providing a camera comprising a photographic lens which is adjustable from a close end position to an infinity end position to obtain a respective focus position corresponding to a subject to be photographed; an image sensor which receives light from the subject which passes through the photographic lens, forms a respective image of the subject, and produces a sensor output which corresponds to the luminous intensity distribution of the received light; and a control unit which (a) determines, based on the sensor output, whether focus detection is possible, (b) causes the photographic lens to scan from the close end position to the infinity end position when focus detection is not possible, (c) amplifies the sensor output by a first gain and performs focus detection based on the first gain amplified sensor output when focus detection is possible, and (d) amplifies the sensor output by a second gain and performs focus detection based on the second gain amplified sensor output when focus detection is not possible, the second gain being greater than the first gain.

Objects are also achieved by providing a camera comprising a photographic lens which is adjustable from a close end position to an infinity end position to obtain a respective focus position corresponding to a subject to be photographed; an image sensor which receives light from the subject that passes through the photographic lens, forms a pair of images of the subject, and produces a pair of sensor output signals which corresponds, respectively, to the pair of images and which represent image data corresponding to the pair of images; and a control unit which (a) determines, based on the pair of sensor output signals, whether focus detection is possible, (b) causes the photographic lens to scan from the close end position to the infinity end position when focus detection is not possible, and (c) performs focus detection by calculating the degree of correlation of the pair of sensor output signals of the image sensor, wherein (i) when the photographic lens is scanning, focus detection is performed on a first group of image data of the sensor output signals, and (ii) when focus detection is possible, focus detection is performed on a second group of image data of the sensor output signal, the first group of image data being a restricted set of image data as compared to the second group of image data.

In addition, objects are achieved by providing a camera comprising a photographic lens which is adjustable from a close end position to an infinity end position to obtain a respective focus position corresponding to a subject to be photographed; an image sensor which receives light from the subject that passes through the photographic lens, forms a pair of images of the subject, and produces a pair of sensor output signals which corresponds, respectively, to the pair of images and which represent image data corresponding to the pair of images; and a control unit which (a) determines, based on the pair of sensor output signals of the image sensor, whether focus detection is possible, (b) causes the photographic lens to scan from the close end position to the infinity end position when focus detection is not possible, and (c) performs focus detection by relatively shifting the image data between the pair of sensor output signals and calculating the degree of correlation of the relatively shifted pair of sensor output signals, wherein (i) when the photographic lens is scanning, focus detection is performed in accordance with a first relative shift between the pair of sensor output signals, and (ii) when focus detection is possible, focus detection is performed in accordance with a second relative shift between the pair of sensor output signals, the first relative shift being a larger relative shift than the second relative shift.

BRIEF DESCRIPTION OF THE DRAWINGS

These and other objects and advantages of the present invention will become apparent and more readily appreciated from the following description of the preferred embodiments, taken in conjunction with the accompanying drawings, of which:

FIGS. 1(A) and 1(B) are diagrams illustrating the position of a focusing lens of a camera during scanning drive.

DESCRIPTION OF THE PREFERRED EMBODIMENTS

FIRST EMBODIMENT

Figure 2:
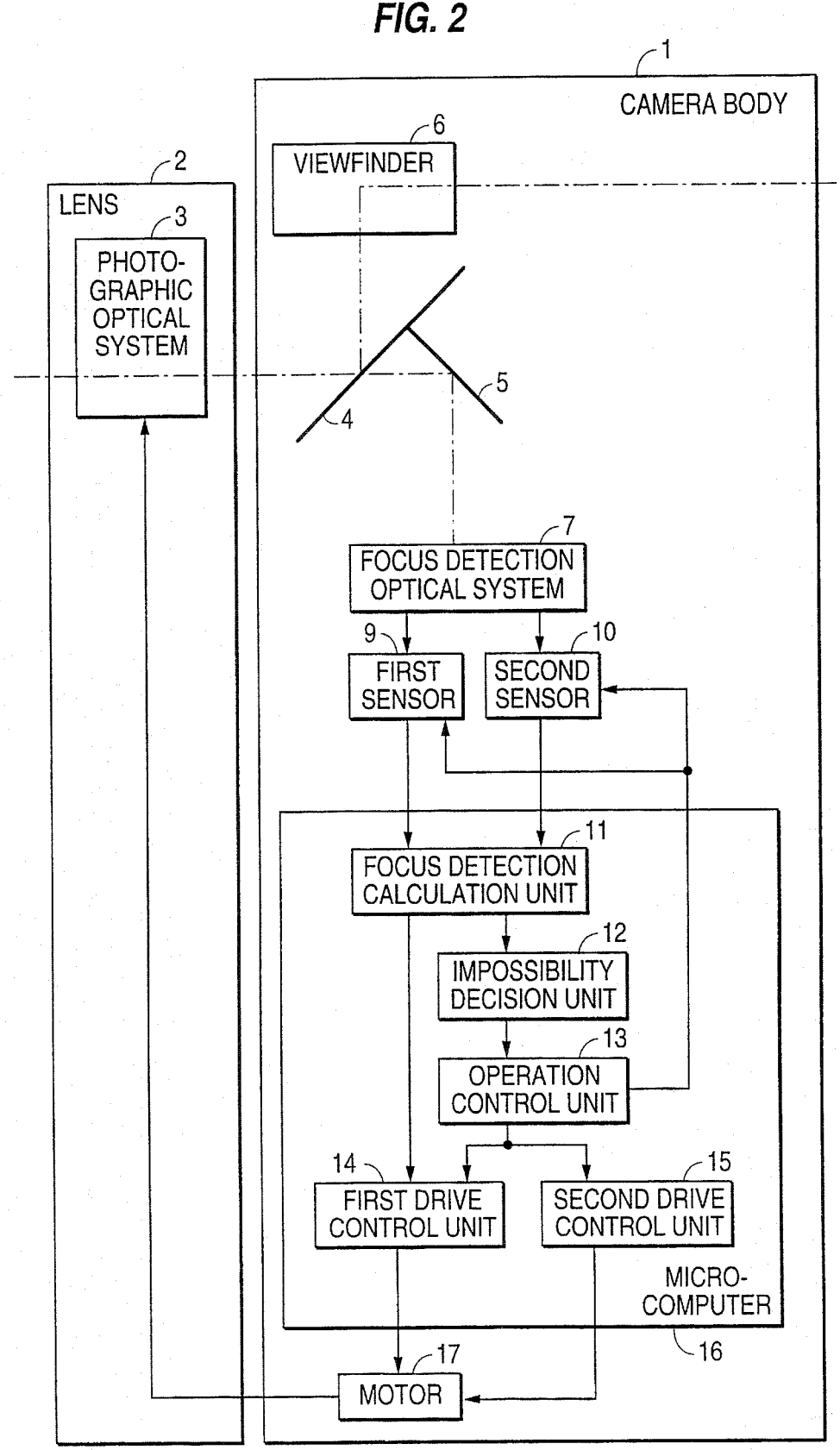
FIG. 2 is a block diagram illustrating a camera according to a first embodiment of the present invention.

Referring now to the figures, wherein like reference numerals represent similar structures or processes throughout the drawings, and more particularly to FIG. 2, which is a block diagram illustrating a camera according to a first embodiment of the present invention. An interchangeable lens 2 is mounted in a camera body 1. A photographic optical system 3 is inside lens 2. Light beams from a photographic subject pass through photographic optical system 3. The light beams are divided by a half-silvered main mirror 4 towards a sub-mirror 5 and a viewfinder 6. Sub-mirror 5 deflects light beams in a downward direction in camera body 1 to pass the light beams to a focus detection optical system 7 located in the vicinity of a prearranged focal plane (not illustrated) of photographic optical system 3.

Focus detection optical system 7 is interfaced to a first image sensor 9 and a second image sensor 10. First image sensor 9 and second image sensor 10 each produce a pair (not illustrated) of electrical subject image signals. The pair of electrical subject image signals of first image sensor 9, or the pair of electrical subject image signals of second image sensor 10, are provided to a focus detection calculation unit 11 of a microcomputer 16. The focus detection calculation unit 11 calculates a relative positional relationship of the pair of subject image signals of the first image sensor 9 or the second image sensor 10 via image displacement calculations to detect a defocus amount DFF of an image plane (not illustrated) and a prearranged focal plane (not illustrated) of photographic optical system 3. Microcomputer 16 operates as a control unit and comprises an impossibility decision unit 12, an operation control unit 13, a first drive control unit 14 and a second drive control unit 15. First drive control unit 14 and second drive control unit 15 are connected to a motor 17 which drives photographic optical system 3.

Figure 3:
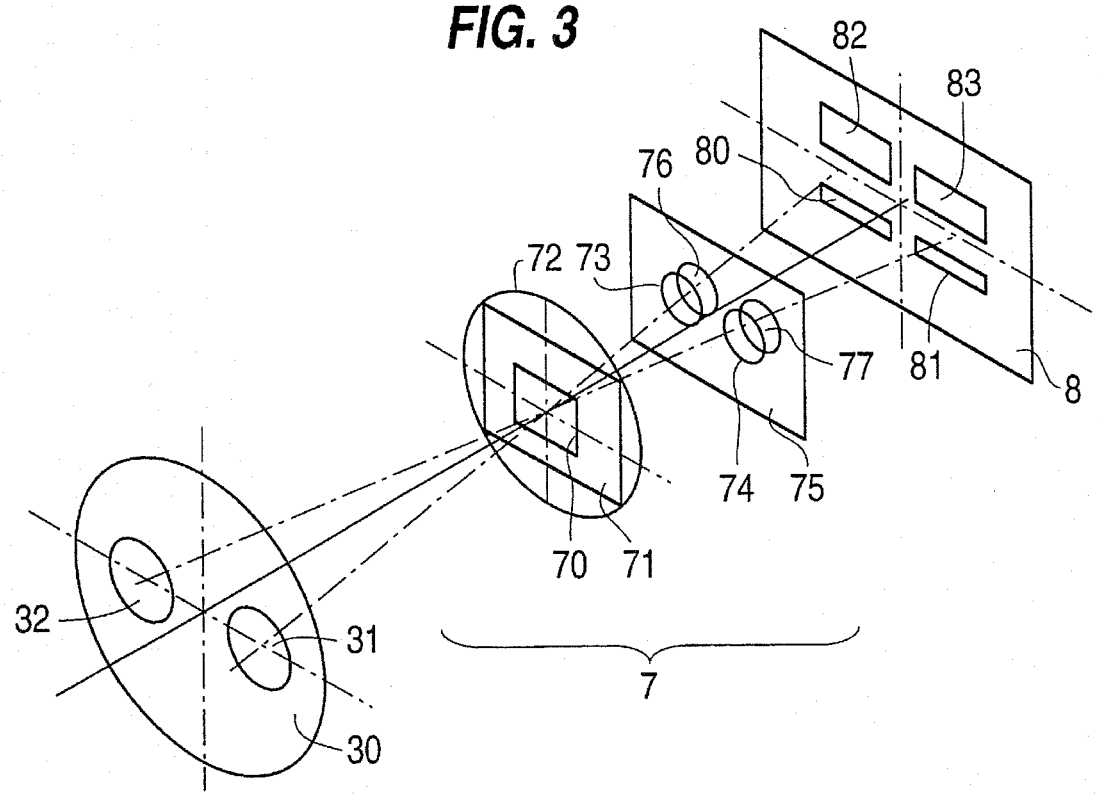
FIG. 3 is an oblique view illustrating a focus detection optical system and an image sensor of a camera according to the first embodiment of the present invention.

FIG. 3 is a diagram illustrating focus detection optical system 7 and a charge accumulation type image sensor of a camera according to the first embodiment of the present invention. Focus detection optical system 7 comprises a visual field mask 71 having an aperture portion 70, a condenser lens 72, a stop mask 75 having pair of stop apertures 73 and 74, and a pair of reimaging lenses 76 and 77. A charge accumulation type image sensor 8 comprises two pairs of light receiving portions 80, 81 and 82, 83.

A primary image of a subject is formed in the vicinity of aperture 70 on the optical axis by photographic optical system 3 and is reimaged as a pair of secondary images on light receiving portions 80, 82 and on light receiving portions 81 and 83 of image sensor 8 by focus detection optical system 7.

The pair of stop apertures 73, 74 are projected by condenser lens 72 in a pair of regions 31 and 32 symmetrical to the optical axis of a plane 30 in the vicinity of the exit pupil position of photographic optical system 3. Light beams passing through regions 31 and 32 form primary images in the vicinity of visual field mask 71. The primary images formed in aperture portions 73, 74 of visual field mask 71 pass through condenser lens 72 and stop apertures 73 and 74. Via reimaging lenses 76 and 77, secondary images are formed on light receiving portions 80, 82 and on light receiving portions 81, 83 of image sensor 8. The luminous intensity distribution of the pair of secondary images is photoelectrically converted by light receiving portions 80, 82 and light receiving portions 81, 83, and becomes electrical subject image signals.

Thus, focal detection optical system 7 can be viewed as forming two separate focus detection optical systems. A first focus detection optical system receives light from the subject passing through photographic optical system 3 and forms an image on first image sensor 9. The second focus detection optical system receives light from the subject passing through photographic optical system 3 and forms an image on second image sensor 10. The first and second focus detection optical systems can have mutually different optical characteristics.

Figure 4:
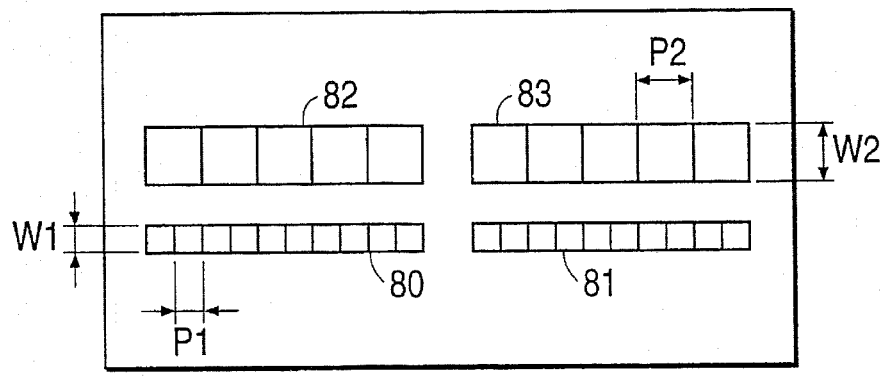
FIG. 4 is a diagram of an image sensor of a camera according to the first embodiment of the present invention.

As illustrated in FIG. 4, light receiving portions 80 and 81 comprise respective pixels, the pitch of the pixels being P1 and the height of the pixels being W1. Moreover, light receiving portions 82 and 83 comprise respectively plural pixels, and the pitch of the pixels is P2, where P2>P1, and the height of the pixels is W2, where W2>W1. Because the pixel area P2×W2 of light receiving portions 82 and 83 is greater than the pixel area P1×W1 of light receiving portions 80 and 81, the charge accumulation time to obtain the same output level becomes shorter for light receiving portions 82 and 83 than for light receiving portions 80 and 81.

Since the pixel areas of the light receiving portions 80, 81 and the light receiving portions 82, 83 are different, respective independent charge accumulation times are arranged such that the output levels become suitable for performing focus detection calculations. Moreover, light receiving portions 80, 81 are included in first image sensor 9 and light receiving portions 82, 83 are included in second image sensor 10. Control of first image sensor 9 and second image sensor 10 is performed by operation control unit 13 in microcomputer 16.

The following is an example of an image displacement calculation algorithm for detecting a defocus amount DEF. The subject image data is respectively represented as ei and fi (where i=1 to m). A correlation amount C(L) is determined by the finite difference type correlation algorithm shown in the following Equation 1A.

Equation 1A:

$$C(L) = \sum_{i=p}^{q} |e(i+L) - f(i)|$$

In Equation 1A, L, an integer, is the amount of relative shift of a pair of output data from light receiving elements having the same pitch taken as a unit. Moreover, the range of L is Lmin–Lmax. Furthermore, the range of the parameter i is from p to q, and is set so that the expression $1 \leq p \leq q \leq m$ is satisfied. Furthermore, the size of the focus detection region is determined by the values of p and q.

Figure 5A:
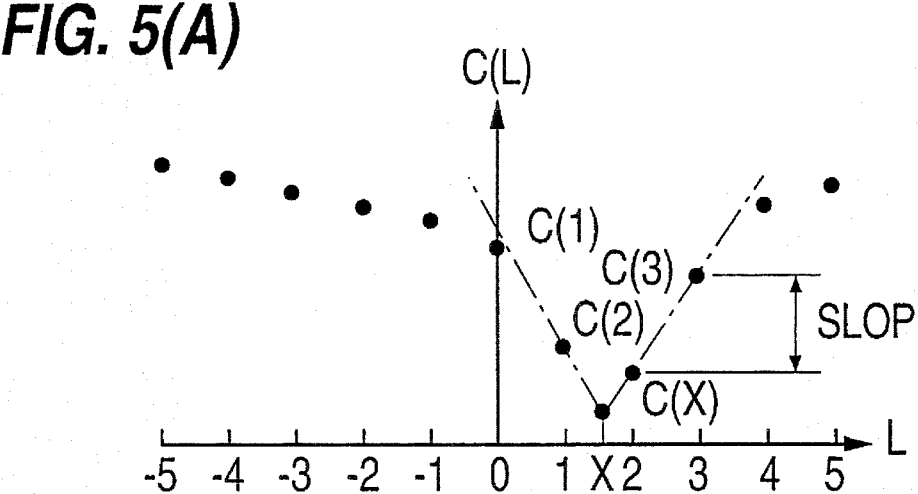
FIGS. 5(A), 5(B) and 5(C) are diagrams illustrating focus detection according to embodiments of the present invention.

FIG. 5(A) illustrates the result of the calculation of Equation 1A. As illustrated in FIG. 5(A), the amount of correlation C(L) is at a minimum in the high correlation shift amount L=kj (in FIG. 5(A), kj=2) of the subject image data. Next, a shift amount x is found which gives a minimum value C(L)min=C(x) for a continuous correlation amount using a three-point interpolation method according to the following Equation 2 through Equation 5.

$x = kj + D/SLOP$  Equation 2:

$C(x) = C(kj) - |D|$  Equation 3

$D = \{C(kj-1) - C(kj+1)\}/2$  Equation 4

$SLOP = \text{Max}\{C(kj+1) - C(kj), C(kj-1) - C(kj)\}$  Equation 5

SLOP is a value which is proportional to the contrast. Moreover, the defocus amount DEF for the prearranged focal plane of the subject image plane can be found by the following Equation 6 from the shift amount x found by using Equations 2 through 5.

$DEF = KX \cdot PY \cdot x$  Equation 6

In Equation 6, PY is the pitch in the row direction of the light receiving elements forming the light receiving portion of the image sensor; KX is the conversion factor determined by the focus detection optical system.

Figure 5B:
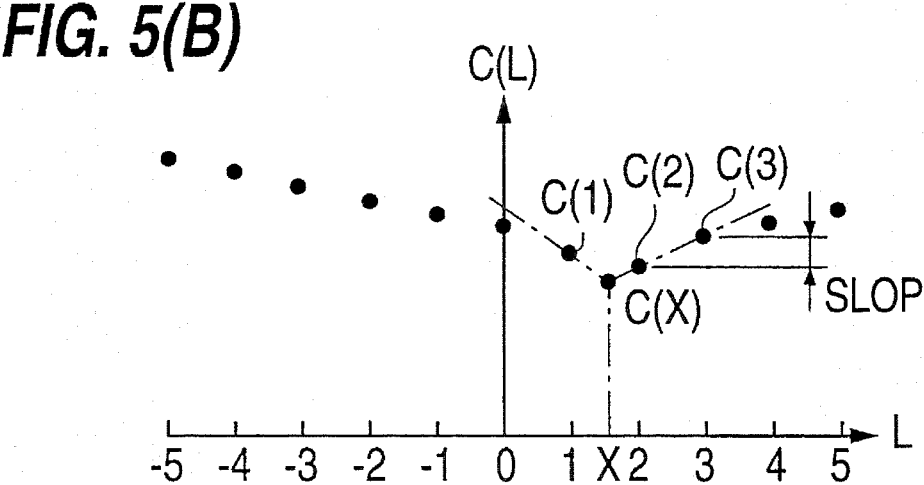

FIG. 5(B) illustrates a situation in which the correlation of the subject data is low and the value of the minimum value C(X) of the interpolated correlation amount is relatively large. Accordingly, the reliability is judged to be low in the case that C(X) is greater than a predetermined value. The reliability is also judged to be low in a situation in which, in order to standardize C(X) at the contrast of the subject image data, the value of C(X) divided by SLOP is greater than a predetermined value. Also, in a situation where SLOP is smaller than a predetermined value, the subject is determined to be of low contrast and it is judged that the reliability of the calculated defocus amount DEF is low.

Figure 5C:
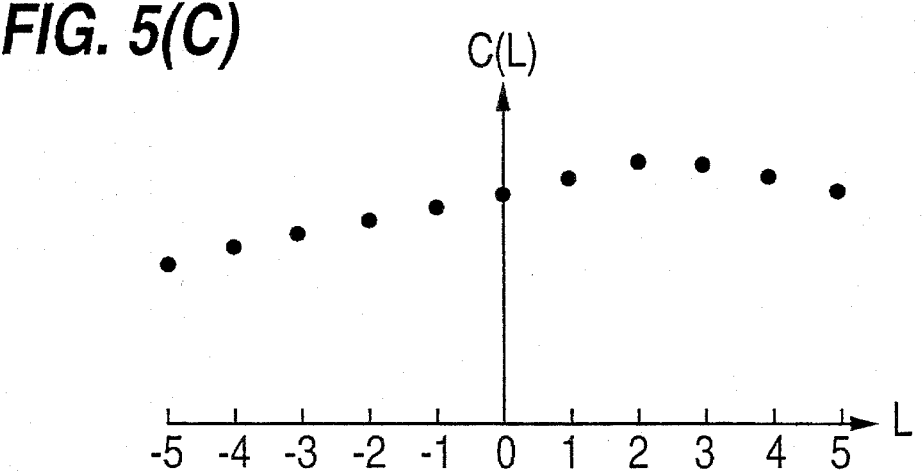

FIG. 5(C) illustrates a situation in which the degree of correlation of the subject data is low and there is no fall of the correlation amount C(L) in the shift range between Lmin and Lmax. Therefore, a minimum value C(X) cannot be found and it is judged that focus detection is impossible.

Before focus detection calculation unit 11 performs the focus detection calculation, focus detection may be judged to be impossible, directly detecting the contrast of the subject image data via the following Equation 7:

Equation 7:

$$Cnt = \sum_{i=1}^{m-1} |e(i) - e(i+1)|$$

Also, when the contrast value Cnt of Equation 7 is less than a predetermined value, the subject image has a low contrast and it is judged that a defocus amount DEF of low reliability will be obtained even with focus detection calculation unit 11 performing the focus detection calculation.

Thus, impossibility decision unit 12 examines whether the defocus amount DEF calculated by focus detection calculation unit 11 is reliable (as discussed in relation to, for example, FIG. 5(B)), or whether the focus detection calculation is possible by focus detection calculation unit 11 in proportion to the contrast of the subject image data (as discussed in relation to, for example, FIG. 5(C)). Impossibility decision unit 12 judges that focus detection is impossible and generates a focus detection impossible signal when either (1) the reliability of the defocus amount DEF is low (that is, below a predetermined value), or (2) the contrast of the subject image data is so low (that is, below a predetermined value) that a focus detection calculation by the focus detection calculation unit 11 is impossible.

When impossibility decision unit 12 judges that focus detection is possible, operation control unit 13 causes first drive control unit 14 to control the direction of and amount of rotation of motor 17 in proportion to the defocus amount DEF. Motor 17 is coupled to photographic optical system 3 to move photographic optical system 3 in the direction of the optical axis such that the defocus amount DEF becomes approximately zero and the photographic optical system 3 thereby reaches the focused state. In this situation, operation control unit 13 selects either first image sensor 9 or second image sensors 10 from predetermined conditions as an image sensor to use in the next image detection operation. For example, in the case that the absolute value of the defocus amount DEF is greater than a predetermined value, operation control unit 13 selects second image sensor 9; if the absolute value of the defocus amount DEF is smaller than the predetermined value, operation control unit 13 selects the first image sensor 10. Alternatively, in the case that the subject luminosity detected by a conventional photometric mechanism (not illustrated), or the subject luminosity calculated on the basis of the accumulation time of the image sensor itself, is lower than a predetermined value, operation control unit 13 selects second image sensor 9; if the subject luminosity is higher than the predetermined value, operation control unit 13 selects first image sensor 10.

Moreover, when impossibility decision unit 12 judges focus detection to be impossible, operation control unit 13 selects second drive control unit 15 for driving motor 17 1:o produce a scanning drive of the photographic optical system 3. Scanning drive causes photographic optical system 3 to be moved between a close end position and an infinity end position, regardless of the defocus amount DEF, and is used to find the focus point. In this case, operation control unit 13 uses second image sensor 10 as the image sensor in the next focus detection operation.

In the above manner, by using a high sensitivity image sensor in scanning drive, the charge accumulation time can be controlled to be as short as possible. This can be compared to a convention camera in which a relatively long charge accumulation time during scanning drive causes the focus point to be missed, or undetected.

Figure 6:
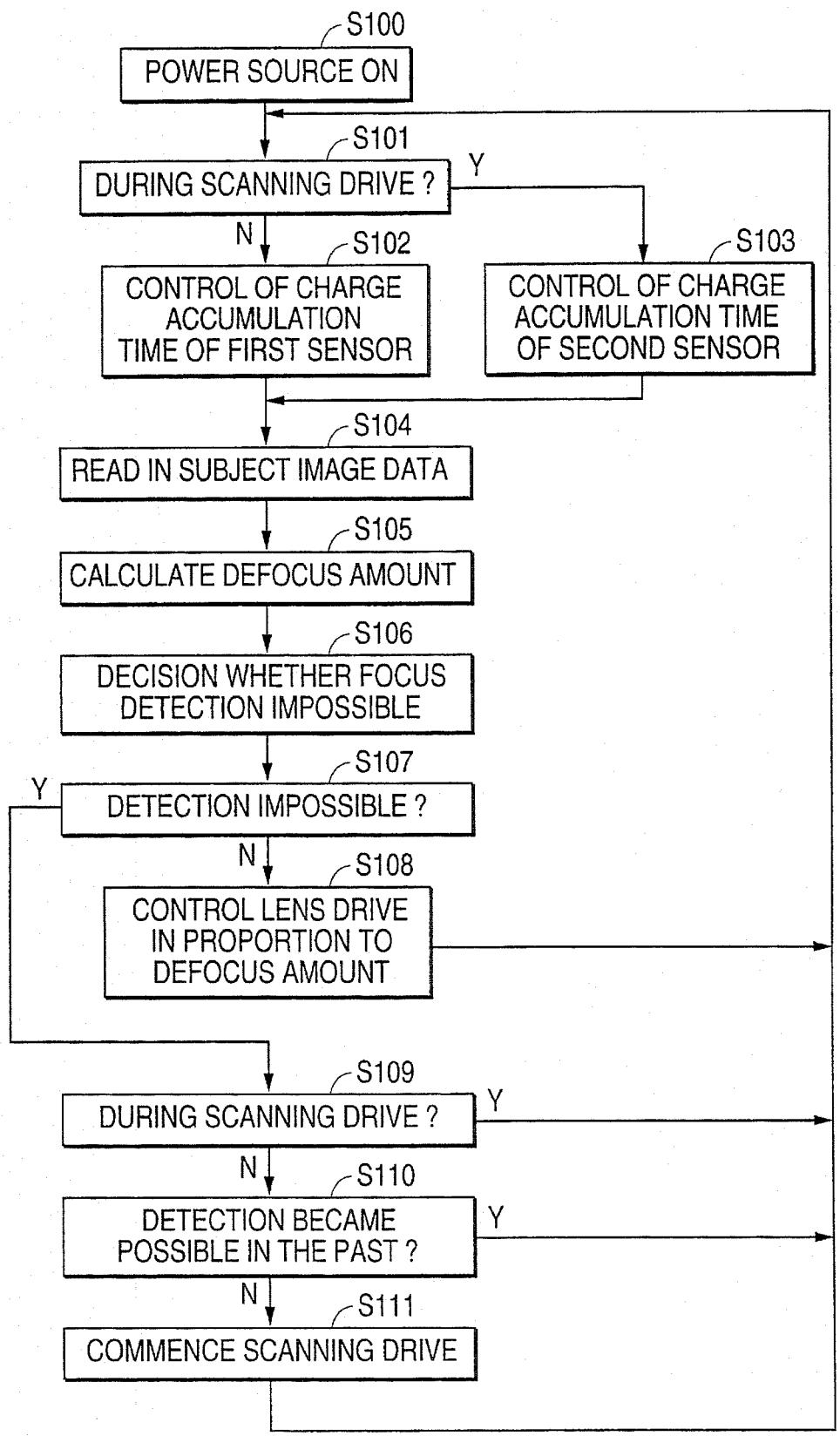
FIG. 6 is a flow chart illustrating a processing sequence of a camera according to the first embodiment of the present invention.

FIG. 6 is flow chart illustrating a processing sequence of microcomputer 16 according to the first embodiment of the present invention. The process starts in step S100 when the power supply is turned ON. Then, the process moves to step S101 where it is determined whether or not photographic optical system 3 is at present in scanning drive. If photographic optical system 3 is in scanning drive in step S101, the high sensitivity second image sensor 10 is selected to shorten the charge accumulation time and the process moves to step S103. On the other hand, if photographic optical system 3 is not in scanning drive in step S101, the relatively low sensitivity first image sensor 9 is selected and the process moves to step S102.

The, reason for selecting second image sensor 10 when photographic optical system 3 is in scanning drive is to allow the focus point to be detected by shortening the accumulation time, thereby shortening the defocus amount calculation time interval and preventing a reduction of contrast due to movement of the image. Moreover, the reason for selecting first image sensor 9 when photographic optical system 3 is not in scanning drive is to heighten the detection ability for a minute subject, since first sensor 9 has a narrow pixel pitch and small pixel height in comparison with second image sensor 10 (see FIG. 4). In summary, second image sensor 10 is selected to attach importance to the time interval of focus detection during scanning drive, and first image sensor 9 is selected to attach importance to fine detection ability when the photographic optical system 3 is not in scanning drive.

In step S102, a charge accumulation operation by first image sensor 9 is performed and the process moves to step S104. On the other hand, in step S103, a charge accumulation operation by second image sensor 10 is performed and the process moves to step S104.

Moreover, the charge accumulation time may be controlled by positioning light quantity monitoring elements (not illustrated) in the vicinity of light receiving portions 80–83 of first image sensor 9 and second image sensor 10, and monitoring the output of these light quantity monitoring elements simultaneously with the commencement of charge accumulation of first image sensor 9 and second image sensor 10. The charge accumulation of first image sensor 9 and second image sensor would be ended at a time when the light quantity monitoring element output has reached a predetermined level. In this case, because the sensitivities of first image sensor 9 and second image sensor 10 are different, the predetermined level is different for the charge accumulation control of first image sensor 9 as compared to the charge accumulation control of second image sensor 10.

The accumulation time is calculated so that the output level of first image sensor or second image sensor 10 becomes a predetermined level and is calculated before the beginning of the accumulation of charges, based on the output level and accumulation time of first image sensor 9 or second image sensor 10 on the previous charge accumulation operation. Charge accumulation control of first image sensor 9 or second image sensor 10 may be performed such that it becomes the calculated accumulation time.

In step S104, subject image data is read in from first image sensor 9 or second image sensor 10. Continuing, in step S105, the subject image data is processed and the defocus amount DEF is calculated. Then, in step S106, a previously described focus detection impossible determination is performed. The process then moves to step S107, where, if it is determined that focus detection is impossible, the process moves to step S109; if it is determined that focus detection is not impossible, the process moves to step S108. In step S108, the amount of drive of photographic optical system 3 is set, based on the calculated defocus amount DEF and, driving motor 17, photographic optical system 3 is moved to the focus position. When photographic optical system 3 is at the focus position, the process returns to step S101 and the abovementioned steps are repeated. Moreover, the process can be designed so that, in step S108, the process returns to step S101 before photographic optical system 3 is completely moved to the focus position.

Moreover, when the focus detection impossible decision in step S 106 is based on the contrast of the subject image before the focus detection calculation using Equation 7, step S105 is performed between step S107 and step S108.

In step S109, the distinction is made as to whether photographic optical system 3 is in scanning drive or not. If photographic optical system 3 is in scanning drive, the process returns to step S101 and scanning drive continues unchanged; if photographic optical system 3 is not in scanning drive in step S109, the process moves to step 110. In step S110, a distinction is made as to whether focus detection has become possible. If focus detection has become possible, the process returns to step S101 without commencing scanning drive; if focus detection has not become possible, the process moves to step S111 where scanning drive is commenced and the process then returns to step S101. From step S110, the process usually moves to step S111. As illustrated in FIG. 6, scanning drive is inhibited once focus detection becomes possible. As a result, scanning drive is not frequently performed. As illustrated by FIG. 6, second image sensor 10 is selected during scanning drive. However, when the condition of the subject luminosity is considered, the charge accumulation time becomes long when in scanning drive and also at low luminosity. Therefore, second image sensor 10 should be selected in this situation. Also, as illustrated by FIG. 6, first image sensor 9 is selected when photographic optical system 3 is not in scanning drive. However, when the condition of subject luminosity is considered, the charge accumulation time can become long even when photographic optical system 3 is not in scanning drive. Therefore, second image sensor 10 should be selected in this situation. Namely, in the case that the reliability of the defocus amount is low, second image sensor 10 should be selected even when focus detection is possible.

In the above-described camera according to a first embodiment of the present invention, as illustrated in FIG. 3, a subject image is formed by a focus detection optical system on two separate image sensors having different pixel areas. However, subject images may also be formed on two separate image sensors using plural focus detection optical systems. In this case, the reimaging magnification from the primary image to the secondary images differs in plural optical systems. Therefore, an image sensor can be selected in proportion to the pixel surface when the image sensor pixel is projected onto the primary image plane. For example, in scanning drive, an image sensor of large pixel surface on the primary image plane is selected.

Thus, according to a camera according to a first embodiment of the present invention, focus detection optical system 7 provides images of a subject via light beams from the subject which pass through photographic optical system. First image sensor 9 receives light of the image via focus detection optical system 7 and outputs a signal in proportion to the luminous intensity distribution of the image. Focus detection calculation unit 11 detects a focus adjustment state of photographic optical system, based on the output of first image sensor 9. Motor 17 drives photographic optical system 3 in accordance with the focus adjustment state detected by focus detection calculation unit 11. A second image sensor 10 has a higher sensitivity than the first image sensor 9.

Thus, in summary, in a camera according to the first embodiment of the present invention, impossibility decision unit 12 determines (1) the possibility of focus detection by focus detection calculation unit 11, and (2) the reliability of the focus detection result. Scanning drive is performed and focus detection is based on the output signals of the high sensitivity second image sensor 10 when it is determined by impossibility decision unit 12 that (a) focus detection is impossible or that, (b) even if focus detection is impossible, that reliability of the focus detection result is low.

In a camera according to the first embodiment of the present invention, the optical characteristics of first image sensor 9 and second image sensor 10 are different. First image sensor 9 and second image sensor 10 comprise charge accumulation type photoelectric conversion elements. The high sensitivity second image sensor 10 accumulates a greater amount of charge than first image sensor 9 when both sensors receive light at the same luminous intensity distribution of the same subject image. According to the first embodiment of the present invention, the picture element area of first image sensor 9 and second image sensor 10 are different.

According to a camera according to the first embodiment of the present invention, scanning drive is not performed and focus detection is not based on second image sensor 10 when impossibility decision unit 12 determines that focus detection is possible and that the reliability of the focus detection result is high. Further, scanning drive is performed and focus detection is based on the high sensitivity second image sensor 10 when impossibility decision unit 12 determines that focus detection is impossible or, even though focus detection is possible, that the reliability of the detection result is low.

SECOND EMBODIMENT

Figure 7:
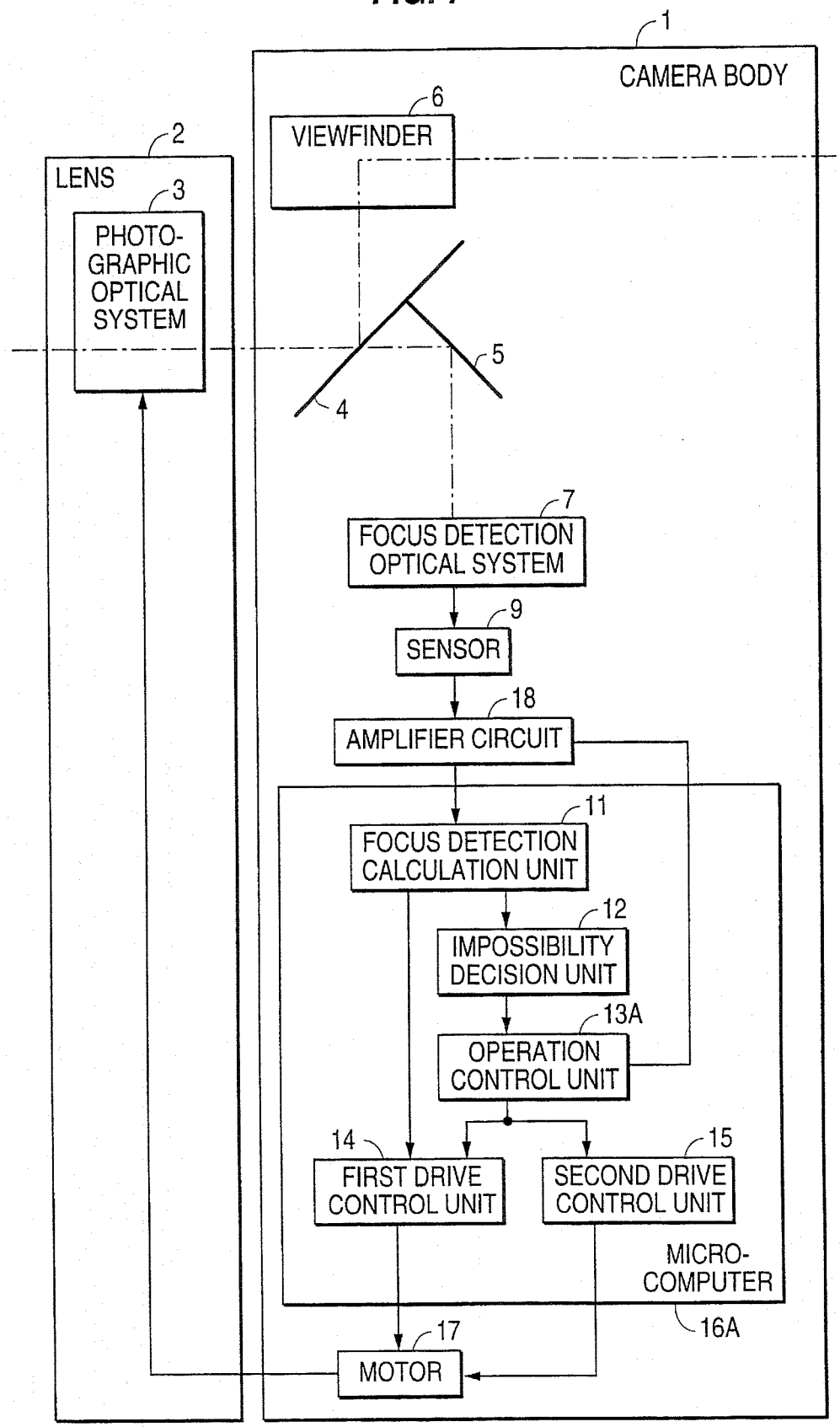
FIG. 7 is a block diagram illustrating a camera according to a second embodiment of the present invention.

FIG. 7 is a block diagram illustrating a camera according to a second embodiment of the present invention. Similar reference numerals in FIG. 7 and FIG. 2 represent similar elements or functions. Since FIG. 7 is very similar to FIG. 2, differences between the figures will be explained.

FIG. 7 illustrates one image sensor 9 (similar to first image sensor 9 in FIG. 2), whereas FIG. 2 illustrates two image sensors (first image sensor 9 and second image sensor 10). Image sensor 9 produces two image signal outputs. In FIG. 7, an amplifier circuit 18 is positioned between image sensor 9 and focus detection calculation unit 11 to amplify the two subject image signal outputs of image sensor 9. Focus detection optical system 7 in FIG. 7 is similar to that shown in FIG. 3, with the exception that image sensor 9 is formed by only one pair of light receiving portions 80 and 81.

Amplifier circuit 18 has a first gain and a second gain, the second gain being higher than the first gain. Amplifier circuit 18 changes between the first gain and the second gain based on control signals from an operation control unit 13A. A microcomputer 16A operates as a control unit and comprises focus detection calculation unit 11, impossibility decision unit 12, operation control unit 13A, first drive control unit 14 and second drive control unit 15.

The decision result of impossibility decision unit 12 is input to operation control unit 13A, and operation control unit 13A controls the gain of amplifier circuit 18 according to the decision result. When focus detection is impossible during scanning drive, amplifier circuit 18 operates at the second gain (high gain) to shorten the accumulation time of image sensor 9; at other times, amplifier circuit 18 operates at the first gain (low gain). In this manner, by using high gain during scanning drive, the charge accumulation time can be kept as short as possible. Therefore, a focus position can be obtained. This can Is, e contrasted to a conventional system in which the focus position could not be obtained during scanning drive since the charge accumulation time was too long.

Figure 8:
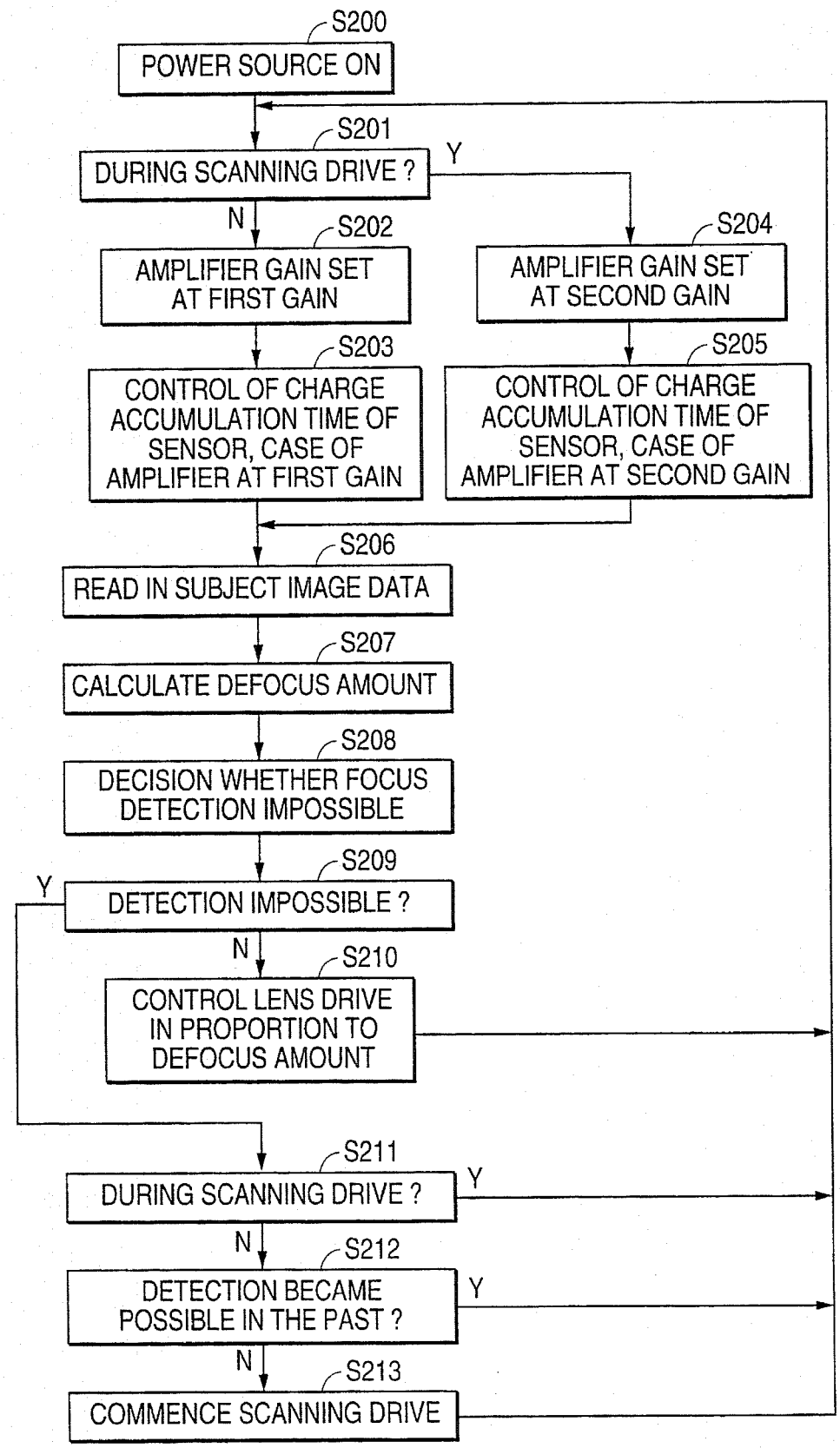
FIG. 8 is a flow chart illustrating a processing sequence of a camera according to the second embodiment of the present invention.

FIG. 8 is a flow chart illustrating a processing sequence of microcomputer 16A. The process starts in step S200 when the power supply is set ON. The process then moves to step S201 and it is determined whether or not photographic optical system 3 is in scanning drive. If photographic optical system 3 is in scanning drive, the gain of amplifier circuit 18 is set to the second gain to shorten the accumulation time of image sensors 9, and the process moves to step S204. If photographic optical system 3 is not in scanning drive in step S201, the gain of amplifier circuit 18 is set to the first gain and the process moves to step S202. The reason for selecting the high gain when in scanning drive is to make the accumulation time short to thereby prevent a reduction of contrast due to image movement. In addition, selecting the high gain acts to shorten the defocus amount calculation time interval, thereby allowing the focus position to be obtained. The reason for selecting the low gain other than during scanning drive is to increase the S/N ratio, thereby making the output level of the image sensor as high as possible. Namely, during scanning drive, importance is attached to the time interval of focus detection and, therefore, the second gain is selected. In other than scanning drive, importance is attached to fine detection ability and, therefore, the first gain is selected.

The first gain is selected in step S202 and, continuing, in step S203, in the case that the subject image signal has been amplified, the charge accumulation time is set such that the subject image signal is at a suitable level for the focus detection calculation. In step S203, image sensor 9 performs the charge accumulation operation. On the other hand, the second gain is selected in step S204 and, continuing, in step S205, the charge accumulation time (this time becomes shorter than the charge accumulation time set in step S203) is set such that the subject image signal, in the case that the subject image signal was amplified at the second gain, is at a suitable level for the focus detection calculation. In step S205, image sensor 9 performs the charge accumulation operation.

The charge accumulation time may be controlled by locating a light quantity monitoring element in the vicinity of the light receiving portions of image sensor 9 and monitoring the output of this light quantity monitoring element simultaneously with the commencement of charge accumulation of image sensor 9. The charge accumulation of the image sensor 9 would be controlled to end at a time when the light quantity monitoring element output reaches a predetermined level. Different predetermined levels are set in the case of amplifying at the first gain and in the case of amplifying at the second gain.

When at the previous detection time the output level of image sensor 9 was P1, the accumulation time A1, and the gain G1, and this time, based on the selected gain G0, the output level of image sensor 9 is a predetermined value P0 and the charge accumulation time is A0. The charge accumulation time A0 of image sensor 9 is calculated prior to accumulating the charges by the following Equation 8.

$$A0=(A1 \times P0 \times G1)/(P1 \times G0) \qquad \text{Equation 8}$$

In step S206, subject image data is read from image sensor 9 and, proceeding to step S207, the subject image data is processed and the defocus amount DEF is calculated. Continuing, in step S208, the focus detection impossible decision is performed. In step S209, if it is determined that focus detection is impossible, the process moves to step S211. If it is determined in step S209 that focus detection is not impossible, the process moves to step S210.

In step S210, the amount of drive of photographic optical system 3 is set, based on the calculated defocus amount DEF, and motor 17 is driven to move photographic optical system 3 to the focus position. When photographic optical system is completely moved to the focus position, the process returns to step S201 and the abovementioned steps are repeated. Moreover, in step S210, the process may return to step S201 before photographic optical system 3 is completely moved to the focus position. If the focus detection impossible decision in step S208 is made from the contrast of the subject image before the, focus detection calculation, step S207 is performed between step S209 and step S210.

In step S211, it is determined whether photographic optical system 3 is in scanning drive or not. If photographic optical system 3 is in scanning drive, the process returns to step S201 and scanning drive is continued unchanged. If photographic optical system is not in scanning drive in step S211, the process moves to step 212 where it is determined whether focus detection has become possible. If focus detection has become possible, the process returns to step S201 without commencing scanning drive. If focus detection has not become possible in step S212, the process moves to step S213 where scanning drive is commenced and the process returns to step S201. In step 212, the routine may usually proceed to step S213. In such a manner, because scanning drive is thereafter inhibited once focus detection has become possible, scanning drive is not frequently performed.

In a camera according to the second embodiment of the present invention, the second gain is selected during scanning drive. However, if the condition of the subject luminosity is also considered, the charge accumulation time becomes relatively long when photographic optical system 3 is in scanning drive and the subject luminosity is low. In this situation, the second gain should be selected. Moreover, according to the second embodiment of the present invention, the first gain is selected in other than scanning drive. However, if the condition of the subject luminosity is also considered, the charge accumulation time can become relatively long even at other than scanning drive. In this situation, the second gain should be selected. In summary, when the reliability of the defocus amount (which is the result of focus detection) is low, the second gain is selected even when focus detection is possible.

In a camera according to the second embodiment of the present invention, the output signal of an image sensor is amplified and focus detection is performed based on the amplified output signal. Thus, the charge accumulation time is shortened during scanning drive, even if the output signal level of the image sensor is low. Since the output signal of the image sensor is amplified, the amount of movement of the photographic optical system in the focus detection period becomes small and the focus position can be obtained. Moreover, once focus detection of the photographic optical system is possible based on the output signal of the image sensor, and also when the reliability of the detection result becomes high, the focus detection based on the scanning drive of the photographic optical system and on amplifying the output signal of the image sensor is thereafter not performed.

THIRD EMBODIMENT

Figure 9:
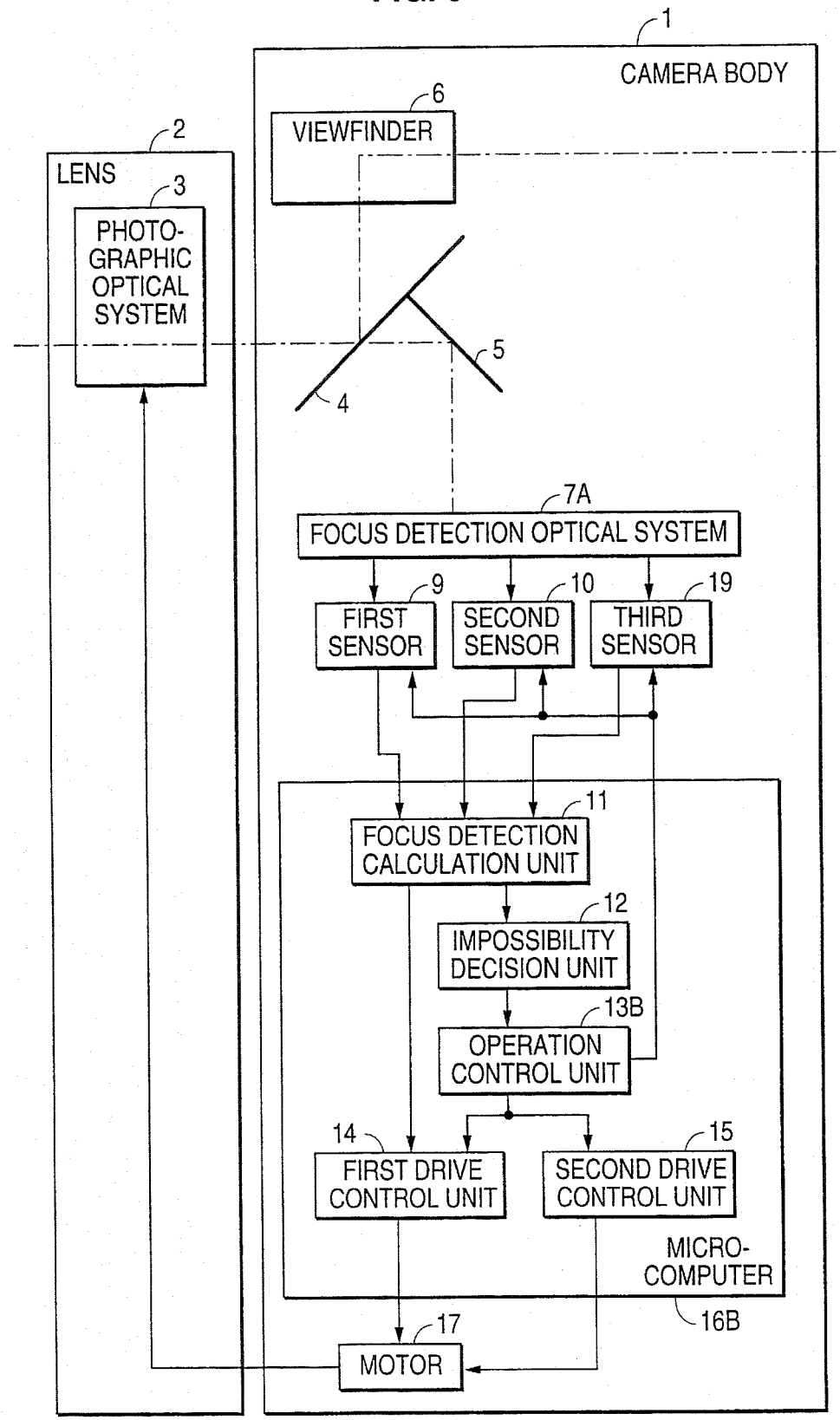
FIG. 9 is a block diagram illustrating a camera according to a third embodiment of the present invention.

FIG. 9 is a block diagram illustrating a camera according to a third embodiment of the present invention. Similar reference numerals in FIG. 9 and FIG. 2 represent similar elements or functions. Since FIG. 9 is very similar to FIG. 2, differences between the figures will be explained.

FIG. 9 illustrates a camera having three image sensors (a first image sensor 9, a second image sensor 10, and a third image sensor 19). Second image sensor 10 corresponds to a focus detection region at the center of the picture plane. First image sensor 9 and third image sensor 19 respectively correspond to focus detection regions at the periphery of the picture plane. A focus detection optical system 7A is connected to first image sensor 9, second image sensor 10 and third image sensor 19. Microcomputer 16B operates as a control unit and comprises focus detection calculation unit 11, impossibility decision unit 12, operation control unit 13B, first drive control unit 14 and second drive control unit 15.

Figure 10:
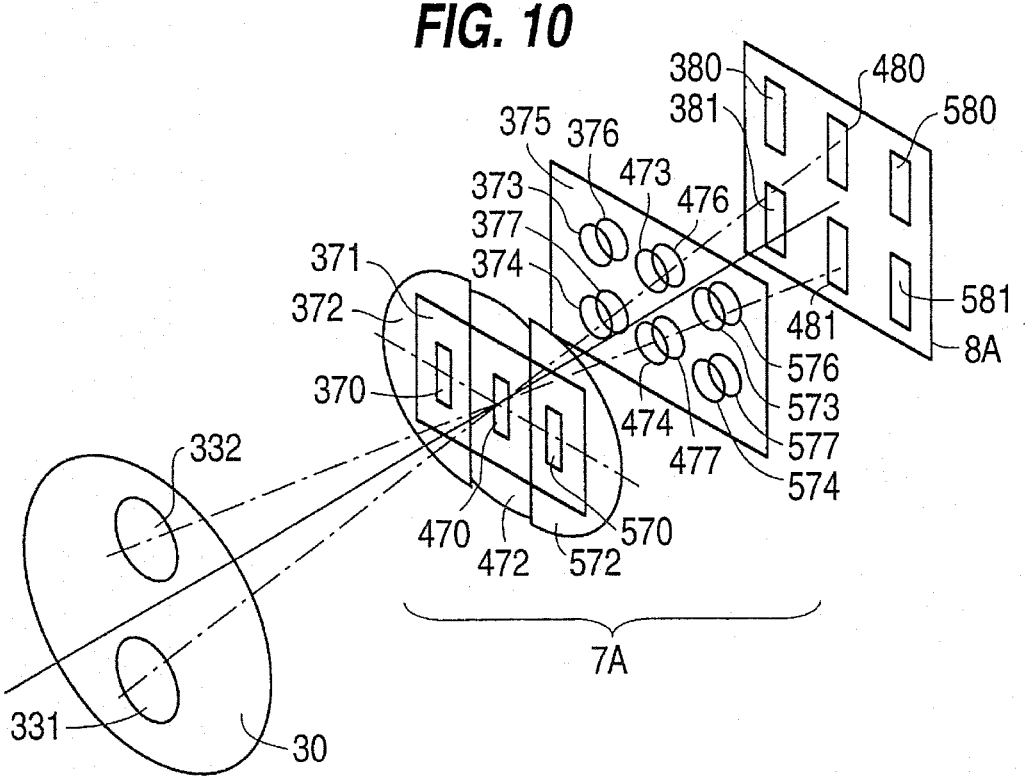
FIG. 10 is an oblique view illustrating a focus detection optical system and an image sensor of a camera according to the third embodiment of the present invention.

FIG. 10 is a diagram illustrating a focus detection optical system and a charge accumulation type image sensor of a camera according to the third embodiment of the present invention. Focus detection optical system 7A has three focus detection regions at the center, left and right of the picture plane, and three reimaging optical systems corresponding to these regions. Focus detection optical system 7A comprises a visual field mask 371 having apertures 370, 470 and 570, condenser lenses 372, 472 and 572, a stop mask 375 having three pairs of stop apertures 373, 374, 473, 474, 573 and 574, and three pairs of reimaging lenses 376, 377, 476, 477, 576 and 577. FIG. 10 also illustrates a charge accumulation type image sensor 8A, three pairs of light receiving portions 380, 381; 480, 481; and 580, 581.

Focus detecting optical system 7A reimages primary images, formed in the vicinity of aperture 370 by the photographic optical system 3, as secondary images on light receiving portions 380 and 381. Focus detecting optical system 7A forms primary images, formed in the vicinity of aperture 470, as secondary images on light receiving portions 480 and 481. Focus detecting optical system 7A forms primary images, formed in the vicinity of aperture 570, as secondary images on light receiving portions 580 and 581. Light receiving portions 380 and 381 correspond to first image sensor 9, light receiving portions 480 and 481 correspond to second image sensor 10, and light receiving portions 580 and 581 correspond to third image sensor 19.

As illustrated in FIG. 10, three pairs of stop aperture portions 373, 374; 473, 474; and 573, 574 are projected by condenser lenses 372, 472 and 572 on a pair of regions 331,332 symmetrical to the optical axis of the plane 30 in the vicinity of the incident pupil of the photographic optical system 3. Light beams passing through these regions first form primary images close to visual field mask 371. A primary image is formed in the aperture portion 370 of the visual field mask 370, passed through a condenser lens 372 and the pair of stop apertures 373 and 374, and is reimaged by a pair of reimaging lenses 376 and 377 as secondary images formed on the light receiving portions 380, 381 of charge accumulation type image sensor 8A. Moreover, a primary image is formed in aperture 470 of the visual field mask 371, passed through the condenser lens 472 and the pair of stop apertures 473 and 474, is reimaged by the pair of reimaging lenses 476 and 477, and is formed as a pair of secondary images on the light receiving portions 480 and 481 of the charge accumulation type image sensor 8A. Furthermore, a primary image is formed in the aperture 570 of the visual field mask 371, passed through the condenser lens 572 and the pair of stop apertures 573 and 574, is reimaged by the pair of reimaging lenses 576 and 577, and is formed as a pair of secondary images on the light receiving portions 580 and 581 of the charge accumulation type image sensor 8A. The luminous intensities of the three pairs of secondary images on light receiving portions 380, 381; 480,481; and 580, 581 are photoelectrically converted, and become electrical subject image signals.

Thus, focus detection optical system 7A can be described as comprising a plurality of focus detection optical systems which correspond, respectively, to a plurality of image sensors (first sensor 9, second sensor 10 and third sensor 19). Each focus detection optical system receives light from the subject passing through photographic optical system 3 and forms an image on the corresponding image sensor.

The decision result of impossibility decision unit 12 is provided to operation control unit 13B, and operation control unit 13B controls first image sensor 9, second image sensor 10 and third image sensor 19. Namely, in order to shorten the transmission time of the subject image signals and the focus detection calculation time, only second image sensor 10 is operated. Otherwise, first image sensor 9, second sensor 10 and third image sensor 19 are each operated. In this manner, by limiting the image sensors used in focus detection during scanning drive, the charge accumulation time can be kept short and the focus position can be obtained. This can be contrasted to conventional cameras which have a long accumulation time during scanning drive and, as a result, cannot obtain a focus position.

Figure 11:
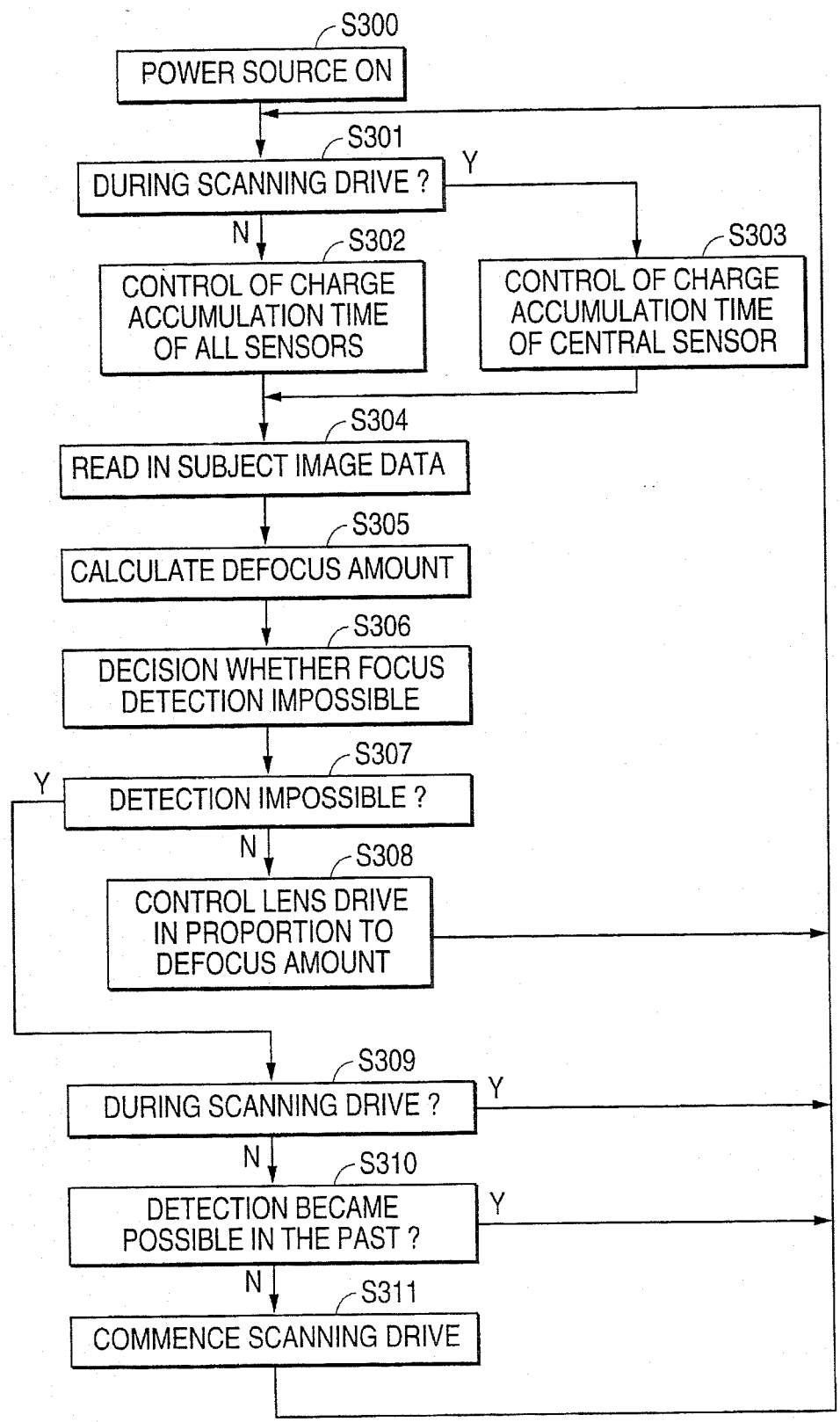
FIG. 11 is a flow chart illustrating a processing sequence of a camera according to the third embodiment of the present invention.

FIG. 11 is a flow chart illustrating a processing sequence of microcomputer 16B of a camera according to the third embodiment of the present invention. The process starts in step S300 when the power supply ON. Then, the process moves to step S301 where it is determined whether or not photographic optical system 3 is in scanning drive. If photographic optical system 3 is in scanning drive, second image sensor 10 (which performs focus detection in the central region of the picture plane) is selected to shorten the accumulation time and the process then moves to step S303. If photographic optical system 3 is not in scanning drive in step S301, first image sensor 9, second image sensor 10 and third image sensor 19 are all selected and the process then moves to step S302.

The reason for selecting second image sensor 10 when in scanning drive is to obtain a focus position by shortening the defocus amount calculation time interval. When photographic optical system 3 is not in scanning drive, the reason for causing charge accumulation by each of the first image sensor 9, second image sensor 10 and third image sensor 19 is to perform focus detection in plural locations in the picture plane and, by analyzing the output of each image sensor, to reliably capture the principal subject. Namely, importance is attached to responsiveness during scanning drive and only the second image sensor 10 is operated during this time. Importance is attached to performing focus detection in all the focus detection regions other than in scanning drive, in order to reliably capture the principal subject, and all the image sensors are operated.

In step S302, a charge accumulation operation by each of the first image sensor 9, second image sensor 10 and third image sensor 19 are performed. On the other hand, in step S303, a charge accumulation operation by only second image sensor 10 is performed. In step S304, subject image data are read in from only the second image sensor 10 if step S303 was performed, and from each of the first image sensor 9, second image sensor 10 and third image sensor 19 if step S302 was performed. Then, in step S305, the subject image data is processed and the defocus amount DEF is calculated. Here, in the case that all of the image sensors were selected, the defocus amount indicating the closest from among the plural defocus amounts calculated based on the subject image data of each image sensor is selected as the defocus amount DEF.

The previously described focus detection impossible decision is performed in step S306. Here, in the case that each of the first image sensor 9, second image sensor 10 and third image sensor 19 were selected, focus detection impossible is decided after focus detection impossible has been decided for the subject image data of each of the image sensors. In step S307, it is determined whether or not focus detection is impossible. In the case that focus detection is impossible, the process moves to step S309 and, if focus detection is possible, the process moves to step S308.

In step S3,08, the drive amount of the photographic optical system 3 is set, based on the calculated defocus amount DEF, and motor 17 is driven to move photographic optical system 3 to the focus position. When the movement of photographic optical system 3 is ended, the process returns to step S301 and the abovementioned steps are repeated. Moreover, in step S308, the routine may be such as to return to step S301 before ending the movement of photographic optical system 3. Further, in the case of making the focus detection impossible decision in step S306 from the contrast of the subject image before the focus detection calculation, step S305 is performed between step S307 and step S308.

In step S309, it is determined whether photographic optical system 3 is in scanning drive or not. If photographic optical system 3 is in scanning drive, the process returns to step S301 and scanning drive continues unchanged. If photographic optical system 3 is not in scanning drive in step S309, the process moves to step 310. In step S310, it is determined whether or not focus detection became possible. If focus detection became possible, the process returns to step S301 without commencing scanning drive and the abovementioned operations are repeated. If focus detection did not become possible in step S210, the process moves to step S311. In step S311, scanning drive is commenced and the process returns to step S301. In step 310, the process usually proceeds to step S311. According to a camera according to the third embodiment of the present invention as illustrated in FIG. 11, because scanning drive is thereafter inhibited once focus detection has become possible, scanning drive is not frequently performed.

According to FIG. 11, only second image sensor 10 is selected during scanning drive. However, when the subject luminosity is considered, the charge accumulation time becomes long when in scanning drive with low luminosity. Therefore, only the second image sensor 10 should be selected. All the image sensors were selected other than in scanning drive. However, when the subject luminosity is considered, the charge accumulation time becomes long even in other than scanning drive with low luminosity. Therefore, second image sensor 10 should be selected in this situation. Namely, in the case that the reliability of the defocus amount DEF is low, only second image sensor 10 is selected, even when focus detection is possible.

According to the third embodiment of the present invention, second image sensor 10 corresponding to the central focus detection region of the picture plane was selected from among the first image sensor 9, second image sensor 10 and third image sensor 19. However, in the case that focus detection is performed by two image sensors placed in correspondence with a cross-shaped focus detection region, only an image sensor in one direction may be caused to operate during scanning drive.

Figure 12:
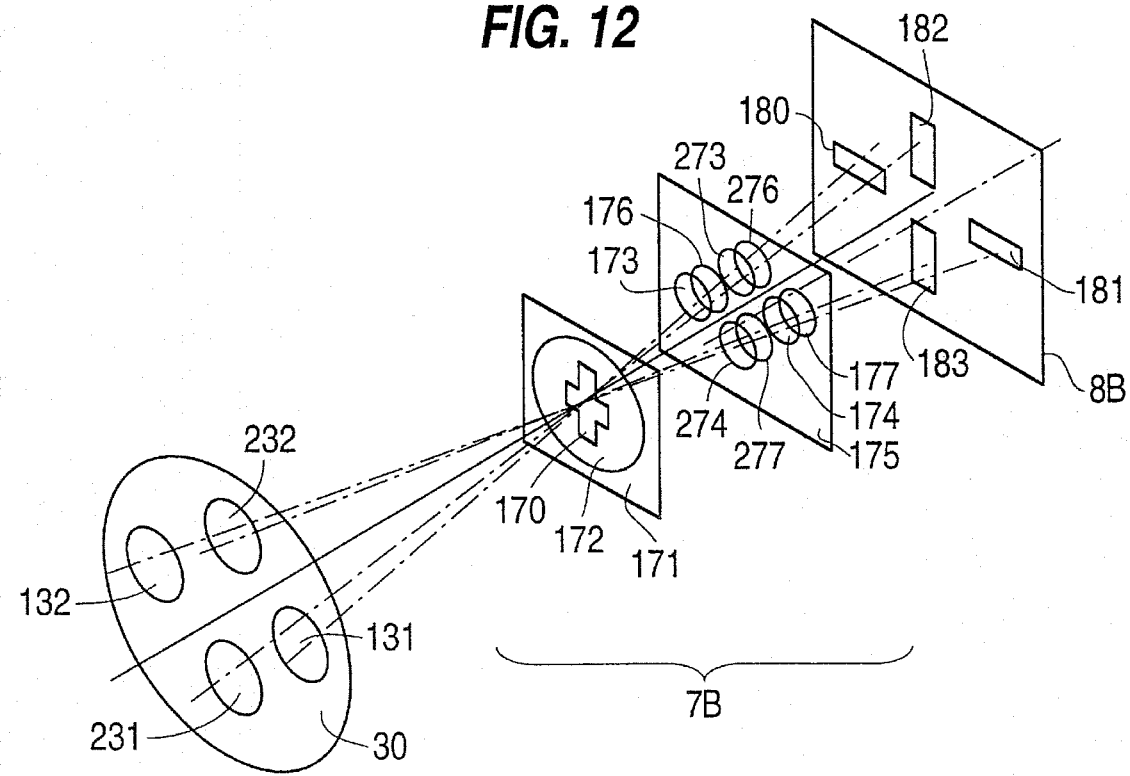
FIG. 12 is an oblique view of a focus detection optical system and image sensor of a camera according to the third embodiment of the present invention.

FIG. 12 is a diagram illustrating a focus detection optical system and charge accumulation type image sensor in the case that focus detection is performed by a cross-shaped focus detection region, according to an embodiment of the present invention. A focus detection optical system 7B comprises a visual field mask 71 having a cross-shaped aperture 170, a condenser lens 172, a stop mask 175 having two pairs of stop apertures 173, 174, 273, 274, and two pairs of reimaging lenses 176, 177, 276, 277. Moreover, a charge accumulation type image sensor 8B is equipped with two pairs of light receiving portions 180, 181,182, 183. Focus detection optical system 7B reimages the primary images formed in the vicinity of the aperture 170 on the optical axis by photographic optical system 3, respectively, as two pairs of secondary images on light receiving portions 180, 182 and 181,183. The pair of stop apertures 173 and 174 are projected by condenser lens 172 onto a pair of regions 131 and 132, which are symmetrical with respect to the optical axis of the plane 30 close to the exit pupil of the photographic optical system 3. Another pair of stop apertures 273 and 274 are projected by condenser lens 172 onto a pair of regions 231 and 232, which are symmetrical with respect to the optical axis of the plane 30 close to the exit pupil of the photographic optical system 3. Light beams passing through these regions first form a primary image close to the visual field mask 171. The primary image formed in the aperture 170 of the visual field mask 171 furthermore forms two pairs of secondary images on the light receiving portions 180 and 182 and on the light receiving portions 181 and 183 of the charge accumulation type image sensor 8B, by two pairs of reimaging lenses 173, 174, 273 and 274 and condenser lens 172. The intensity distribution of the two pairs of secondary images is photoelectrically converted at light receiving portions 180, 182 and 181,183, and becomes electrical subject image signals.

According to the third embodiment of the present invention, arranging normal sensitivity image, sensors and high sensitivity image sensors to receive light of subject images imaged by a focus detection optical system, focus detection is typically performed based on the output signal of the normal image sensor. However, when the focus detection of the photographic optical system is impossible based on the output signal of the normal image sensor, or the reliability of the detection result is low, scanning drive of the photographic optical system is performed and, in addition, the focus detection is performed based on the output signal of the high sensitivity image sensor. Therefore, the charge accumulation time during the scanning drive of the photographic optical system is shortened, the focus detection interval becomes short and the amount of movement of the photographic optical system in the focus detection period becomes small. As a result, the focus position of the subject during the scanning drive can be obtained. Also, with a conventional camera, the subject image moves on the image sensor during the scanning drive, the contrast decreases, and focus detection becomes impossible. These problems do not occur with a camera according to the third embodiment of the present invention. According to the embodiment of the present invention, the focus position can be reliably detected during scanning drive. Moreover, once focus detection of the photographic optical system is possible based on the output signal of the normal image sensor, and also the reliability of the detection result is high, the focus detection based on the scanning drive of the photographic optical system and on the output signal of the high sensitivity image sensor is thereafter not performed. As a result, a frequent operation of scanning drive is prevented.

According to the third embodiment of the present invention, with plural focus detection optical systems and plural image sensors respectively corresponding to plural focus detection regions arranged in the photographic picture plane of the photographic optical system, focus detection is generally performed based on the output signal of each image sensor. When focus detection of the photographic optical system is impossible based on the output signals of these image sensors, or even if focus detection is possible but the reliability of the focus detection result is low, scanning drive of the photographic optical system is performed and, in addition, focus detection is performed based on the output signal of a specific image sensor among the plural image sensors. As a result, the focus detection interval during the scanning drive of the photographic optical system is short and the amount of movement of the photographic optical system in the focus detection period is small.

In a camera according to a third embodiment of the present invention, focus detection optical system 7A has plural focus detection regions disposed on the photographic image plane of photographic optical system 3. Focus detection optical system 7A processes plural subject images via light which passes through the respective focus detection regions. Plural image sensors respectively receive light from the plural subject images and output signals in proportion to the luminous intensity distribution of the subject images. Focus detection calculation unit determines a focus adjustment state of photographic optical system 3 based on the output signals of the image sensors. Photographic optical system 3 is driven in accordance with the focus adjustment state.

In a camera according to the third embodiment of the present invention, impossibility decision unit 12 determines (1) whether or not focus detection by focus detection calculation unit 11 is possible, and (2) whether the focus detection result is reliable. Scanning drive is performed when impossibility decision unit 12 determines that focus detection is impossible or, even though focus detection is possible, that the reliable of the focus detection result is low. During scanning drive, focus detection is based on output signals of a specific image sensor within the plural image sensors.

In a camera according to the third embodiment of the present invention, first image sensor 9, second image sensor 10 and third image sensor 19 comprise charge accumulation type photoelectric conversion elements. Also, a portion of the plural focus detection regions of focus detection optical system 7A can be made to overlap. Moreover, one of the plural focus detection regions can be located in the circumference of the photographic image plane, and a different focus detection region can be located at the center of the photographic image plane.

FOURTH EMBODIMENT

Figure 13:
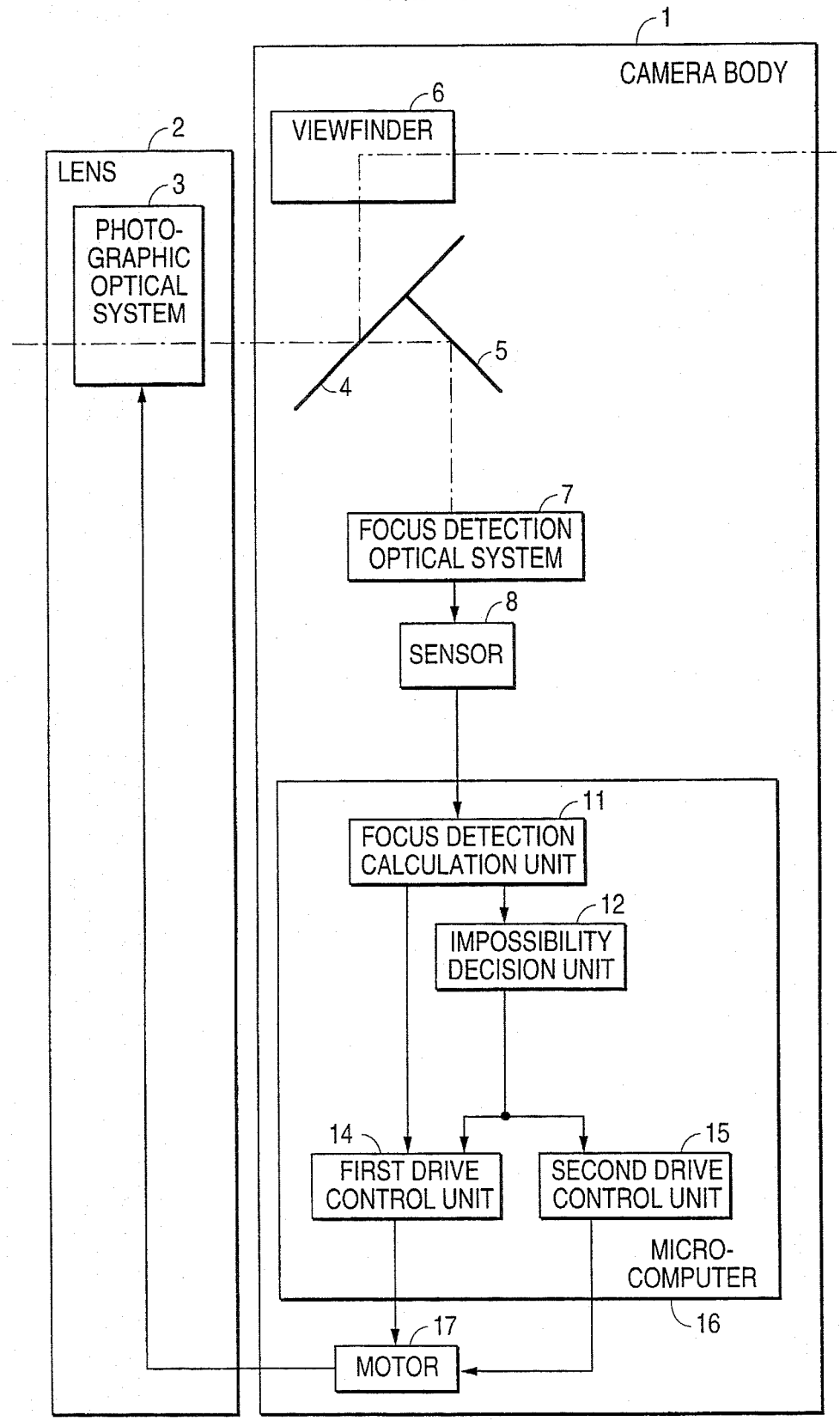
FIG. 13 is a block diagram of a camera according to a fourth embodiment of the present invention.

FIG. 13 is a block diagram illustrating a camera according to a fourth embodiment of the present invention. Similar reference numerals in FIG. 13 and FIG. 2 represent similar elements or functions. Since FIG. 13 is very similar to FIG. 2, differences between the figures will be explained.

FIG. 13 illustrates only one image sensor, that is, image sensor 8. A pair of electrical subject image signals of image sensor 8 is introduced into microcomputer 16. Focus detection calculation unit 11 calculates the relative positional relationship of the pair of subject image signals via image displacement calculations to detect the defocus amount DEF of the image plane and prearranged focal plane of photographic optical system 3. Microcomputer 16 operates as a control unit and comprises focus detection calculation unit 11, impossibility decision unit 12, first drive control unit 14 and second drive control unit 15. Impossibility decision unit 12 examines whether the defocus amount DEF calculated by the focus detection calculation unit 11 is reliable, or whether the focus detection calculation is possible by focus detection calculation unit 11 in proportion to the contrast of the subject image data. In the case that the reliability of the defocus amount DEF is low, or in the case that the contrast of the subject image data is low and a focus detection calculation by the focus detection calculation unit 11 is therefore impossible, it is judged that focus detection is impossible and a focus detection impossible signal is generated.

In the case that the correlation of the subject data is low, as shown in FIG. 5(B), the correlation value of the minimum value C(X) of the interpolated correlation amount becomes large. Accordingly, the reliability is judged to be low in the case that C(X) is greater than a predetermined value. Alternatively, in order to standardize C(X) at the contrast of the subject image data, a value of C(X) is divided by SLOP. SLOP is a value which is proportional to the contrast. If the value of C(X) divided by SLOP is greater than a predetermined value, the reliability is judged to be low. Also, in the case that SLOP is smaller than a predetermined value, the subject is of low contrast and it is judged that the reliability of the calculated defocus amount DEF is low.

In the case that the degree of correlation of the subject data is low, as shown in FIG. 5(C), there is no fall of the correlation amount C(L) in the shift range and a minimum value C(X) cannot be found. In this case, it is judged that focus detection is impossible.

Before focus detection calculation unit 11 performs the focus detection calculation, focus detection may be judged to be impossible, directly detecting the contrast of the subject image data in accordance with the following Equation 7.

$$Cnt = \Sigma |A(I) - A(i+1)| \quad \text{Equation 7}$$

In the above Equation, $\Sigma$ represents the sum from $i=1$ to $i=m-1$. In the case that the contrast value Cnt is less than a predetermined value, the subject image has a low contrast and it is judged that a defocus amount DEF of low reliability will be obtained even with focus detection calculation unit 11 performing the focus detection calculation. Impossibility decision unit 12 generates a focus detection impossible signal if impossibility decision unit 12 determines that focus detection is impossible.

In the case that impossibility decision unit 12 determines that focus detection is possible, first drive control unit 14 controls the direction of rotation and amount of rotation of motor 17 in proportion to the defocus amount DEF. Motor 17 is coupled to photographic optical system 3 to move photographic optical system 3 in the direction of the optical axis, driven such that the defocus amount DEF becomes zero and photographic optical system 3 reaches the focused state.

On the other hand, in the case that impossibility decision unit 12 determines that focus detection is impossible, photographic optical system is driven in scanning drive to locate the focus point. Therefore, second drive control unit 15 controls motor 17 so that photographic optical system 3 scans between a close end position and an infinity end position, regardless of the defocus amount DEF. Moreover, in the case that focus detection does not become possible even when performing scanning drive, the scanning drive is ended by a predetermined routine. For example, scanning drive begins, photographic optical system 3 is driven to the close end position, the scanning direction is then reversed and photographic optical system is driven to the infinity end position and, at the time of reaching the infinity end position in the case that focus detection is impossible, the scanning drive ends.

Moreover, during scanning drive by second drive control unit 15, focus detection calculation unit 11 performs focus detection calculations with a second focus detection calculation process (discussed below) and, other than in scanning drive, focus detection calculation unit 11 performs focus detection calculations with a first focus detection calculation process (discussed below). In the second focus detection calculation process, as discussed below, focus detection calculations are performed with a small calculation gauge. Therefore, during scanning drive, the calculation time can be reduced by use of the second focus detection calculation process and the focus point can be obtained.

Figure 14:
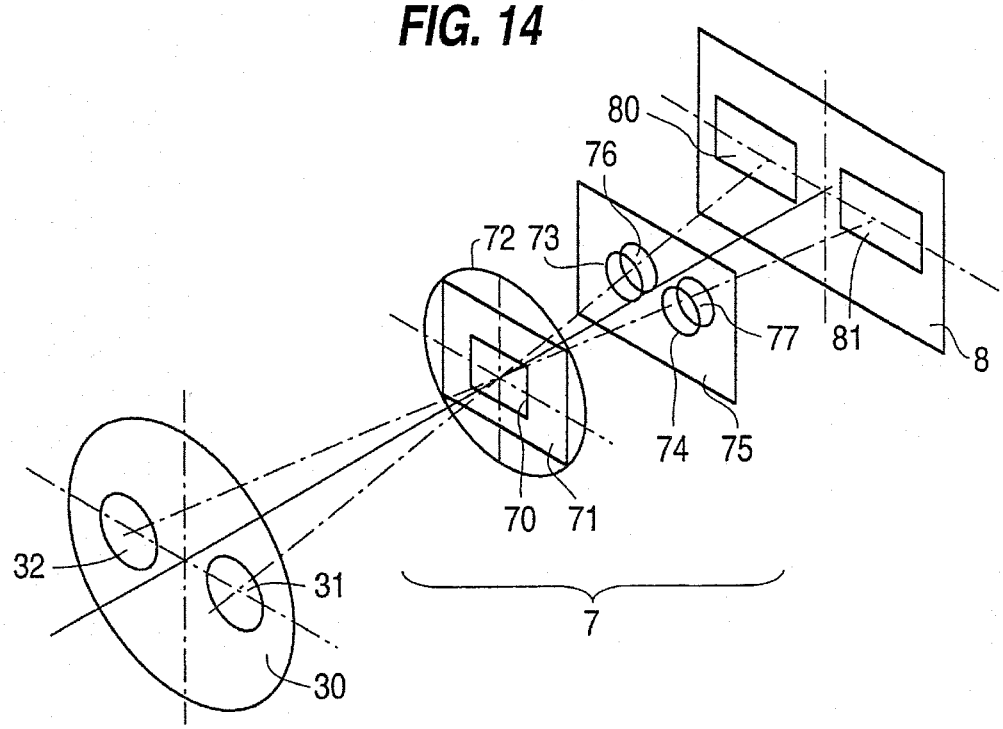
FIG. 14 is an oblique view of a focus detection optical system of a camera according to the fourth embodiment of the present invention.

FIG. 14 is a diagram illustrating a focus detection optical system and a charge accumulation type image sensor according to the fourth embodiment of the present invention. Focus detection optical system 7 has a visual field mask 71 having an aperture portion 70, a condenser lens 72, a stop mask 75 having pair of stop apertures 73 and 74, and a pair of reimaging lenses 76 and 77. Moreover, a charge accumulation type image sensor 8 has a pair of light receiving portions 80 and 81. A primary image of a subject is formed in the vicinity of the aperture 70 on the optical axis by photographic optical system 3 and reimaged as a pair of secondary images on light receiving positions 80, 81 of image sensor 8 by focus detection optical system 7. The pair of stop apertures 73, 74 are projected by condenser lens 72 in a pair of regions 31 and 32 symmetrical to the optical axis of the plane 30 in the vicinity of the exit pupil position of photographic optical system 3. Light beams passing through regions 31 and 32 form primary images in the vicinity of visual field mask 71. The primary images formed in aperture portions 73, 74 of visual field mask 71 furthermore pass through condenser lens 72 and the pair of stop apertures 73 and 74, and via the pair of reimaging lenses 76 and 77, secondary images are formed on light receiving portions 80, 81 of charge accumulation type image sensor 8. The luminous intensity distribution of the pair of secondary images is photoelectrically converted by light receiving portions 80, 81, and becomes electrical subject image signals.

FIRST FOCUS DETECTION CALCULATION PROCESS EXECUTED WHEN IN NON-SCANNING DRIVE

The following is a description of a "first" focus detection calculation process which is executed when in non-scanning drive.

Subject image data is respectively represented as Ai and Bi (where i=1–20). A correlation amount C(L) is found by a finite difference type correlation algorithm, shown in Equation 1B.

$$C(L)=\Sigma|A(i+L)-B(i)| \qquad \text{Equation 1B}$$

In Equation 1B, Σ represents the operation of summing i from i=j to i=j+7. L, an integer, is the amount of relative shift of a pair of light receiving element output data with the pitch of the light receiving elements taken as a unit. The range of L is from −12 to +12. Furthermore, j is a value proportional to the shift amount L. For example, in the case of L=0, j equals 7.

Figure 15:
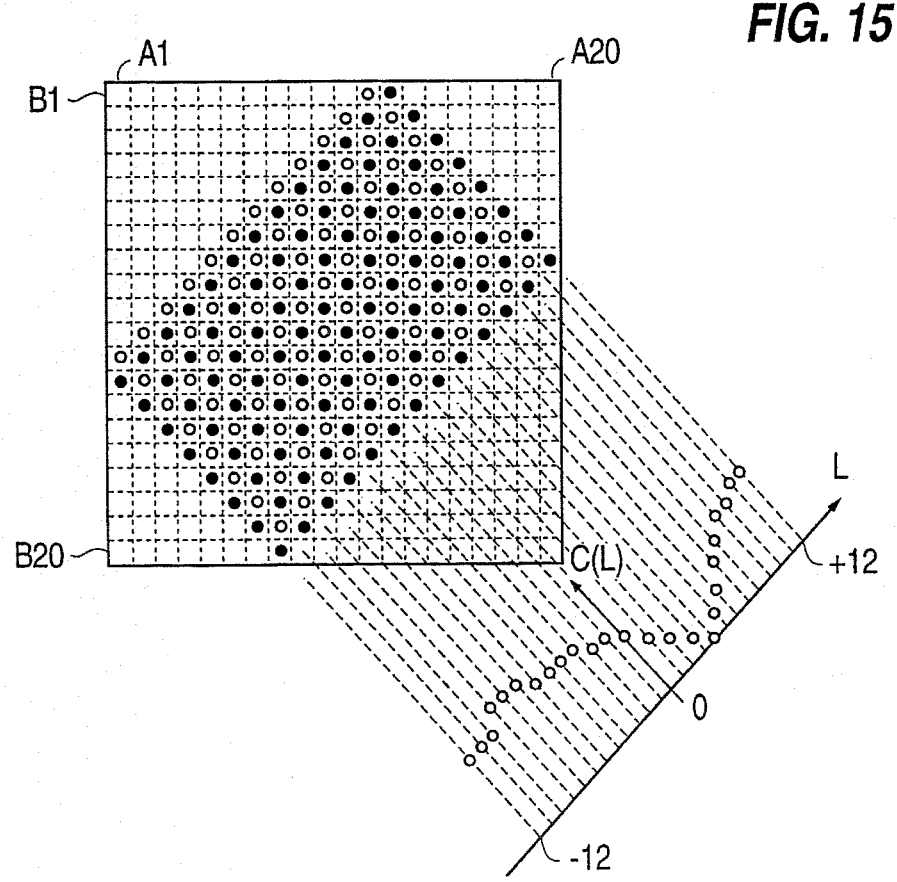
FIG. 15 is a diagram illustrating a first calculation process of a camera according to the fourth embodiment of the present invention.

The result of the calculation of Equation 1B is shown in FIG. 15. The subject image data Ai are shown on the abscissa, and the subject image data Bi are shown on the ordinate. The positions of combination performing calculation of the respective differences are represented by white circles ○ and black circles ●. As illustrated in FIG. 15, the number of summation calculations is eight and is represented in the obliquely down right direction. Addition is performed at the respective white circle ○ neighbor or black circle ● neighbor. The value of the calculation result of the correlation amount C(L) is represented by the white circles ○ with the shift amount L on the abscissa.

The "gauge" of the first focus detection calculation process is defined as the number of calculations of the absolute value of the difference. As illustrated in FIG. 15, the gauge is the total number of the white circles ○ and black circles ● and equals 25×8=200.

Previously described FIGS. 5(A)–5(C) illustrate a sequence to calculate the defocus amount from the amount of correlation C(L).

The result of the calculation of Equation 1B, as shown in FIG. 5(A), is that the amount of correlation C(L) becomes a minimum at the high correlation shift amount L=kj (in FIG. 5(A), kj=2) of the subject image data. Next, the shift amount x is found which gives a minimum value C(L)min =C(x) for a continuous correlation amount, using a three-point interpolation according to the following Equation 2 through Equation 5.

$$x=kj+D/SLOP \qquad \text{Equation 2}$$

$$C(x)=C(kj)-|D| \qquad \text{Equation 3}$$

$$D=\{C(kj-1)-C(kj+1)\}/2 \qquad \text{Equation 4}$$

$$SLOP=\text{Max}\{C(kj+1)-C(kj),\ C(kj-1)-C(kj)\} \qquad \text{Equation 5}$$

The defocus amount DEF for the prearranged focal plane of the subject image plane can be found, based on the shift amount x, by the following Equation 6.

$$DEF=KX\cdot PY\cdot x \qquad \text{Equation 6}$$

In Equation 6, PY is the pitch in the row direction of the light receiving elements comprising the light receiving portion of the image sensor; KX is a conversion factor determined by the focus detection optical system.

SECOND FOCUS DETECTION PROCESS—EXECUTED IN SCANNING DRIVE

The following is a description of a "second" focus detection calculation process which is executed in scanning drive.

The second focus detection calculation process can calculate the focus detection in accordance with any of the methods (1), (2), (3) or (4), discussed below.

(1) Calculation process where the shift amount is large

Figure 16:
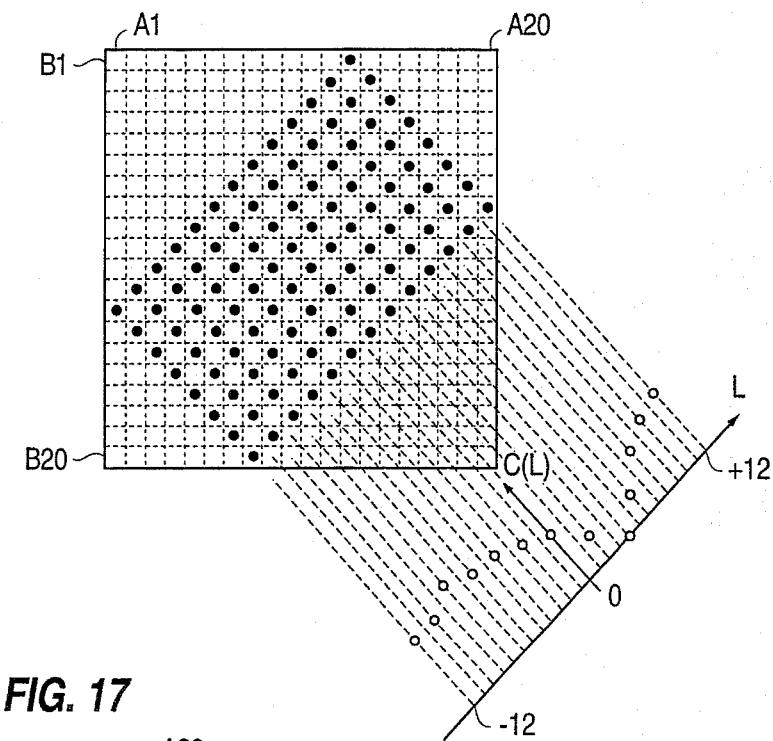
FIG. 16 is a diagram illustrating a second calculation process of a camera according to the fourth embodiment of the present invention.

During normal focus detection (that is, the camera is not in scanning drive), the calculation of the correlation amount C(L) is performed, causing the shift amount L to change by one in the range −12 to +12. In contrast to this, as illustrated in FIG. 16, during focus detection while the camera is in scanning drive, the calculation of the correlation amount C(L) is performed with the shift amount L changing by two in the range −12 to +12. By performing the calculation of the correlation amount C(L) while making the shift amount L large in this manner, the accuracy of focus detection decreases. However, the calculation gauge becomes small and the calculation time is thereby reduced.

The gauge of the second focus detection calculation process, as described above, equals 13×8=104. This is much less then the gauge of 200 calculated above for the first focus detection calculation process.

(2) Calculation process, restricting the subject image data

Figure 17:
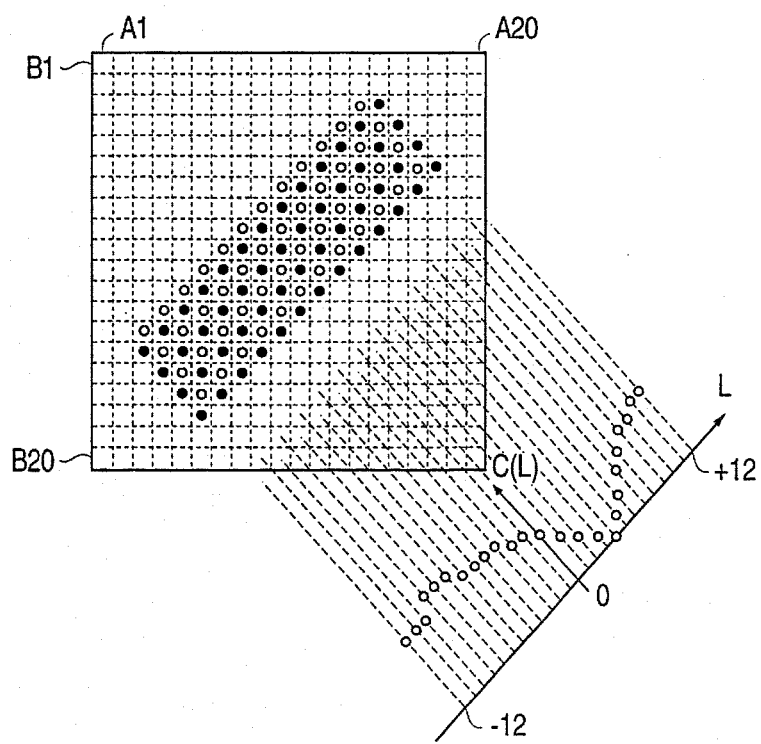
FIG. 17 is a diagram illustrating an additional calculation process of a camera according to the fourth embodiment of the present invention.

In contrast to the normal focus detection time in which the calculation of the correlation amount C(L) of Equation 1B is performed with the parameter i to change from j to j+7, the focus detection during scanning drive performs the calculation of the correlation amount C(L) with the parameter changing from j' to j'+3, as shown in FIG. 17. By performing the calculation of the correlation amount C(L) while restricting the subject image data in this manner, the accuracy of focus detection decreases. However, the calculation gauge becomes small and the calculation time is thereby reduced.

The gauge of the second focus detection calculation process, as illustrated in FIG. 17, equals 25×4=100.

(3) Calculation process, thinning out subject data

Figure 18:
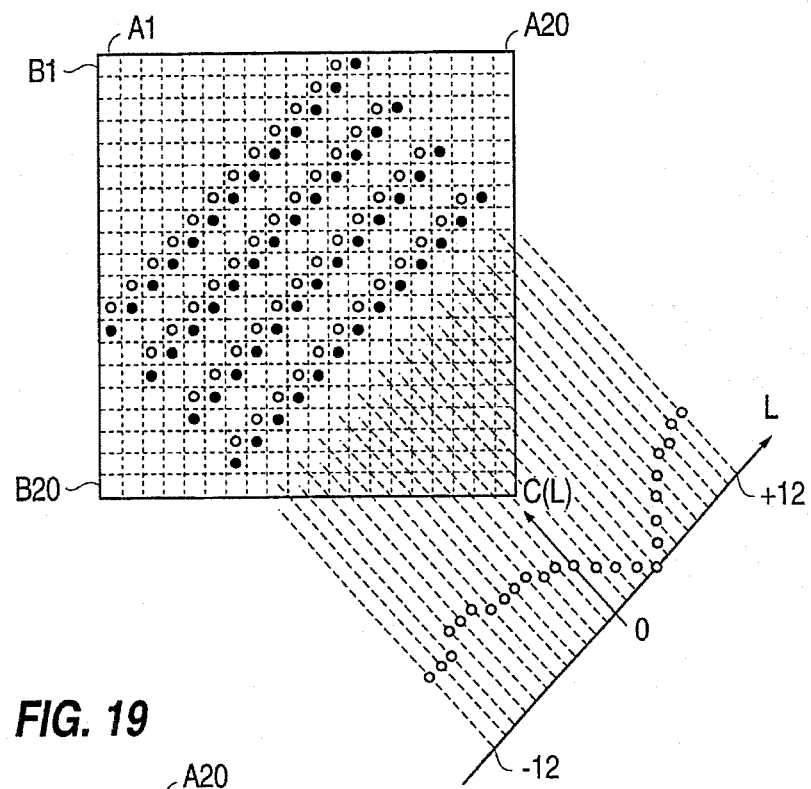
FIG. 18 is a diagram illustrating a further calculation process of a camera according to the fourth embodiment of the present invention.

In contrast to the normal focus detection time in which the calculation of the correlation amount C(L) of Equation 1B is performed with the parameter i changing by one at a time, the focus detection during scanning drive performs the calculation of the correlation amount C(L) changing the parameter i by two at a time, as illustrated in FIG. 18. By performing the calculation of the correlation amount C(L) while thinning out the subject image data in this manner, the accuracy of focus detection decreases. However, the gauge becomes small and the calculation time is thereby reduced.

The gauge of the second focus detection calculation process, as illustrated in FIG. 18, equals 25×4=100.

(4) Calculation process by a combination of (1) and (2)

Figure 19:
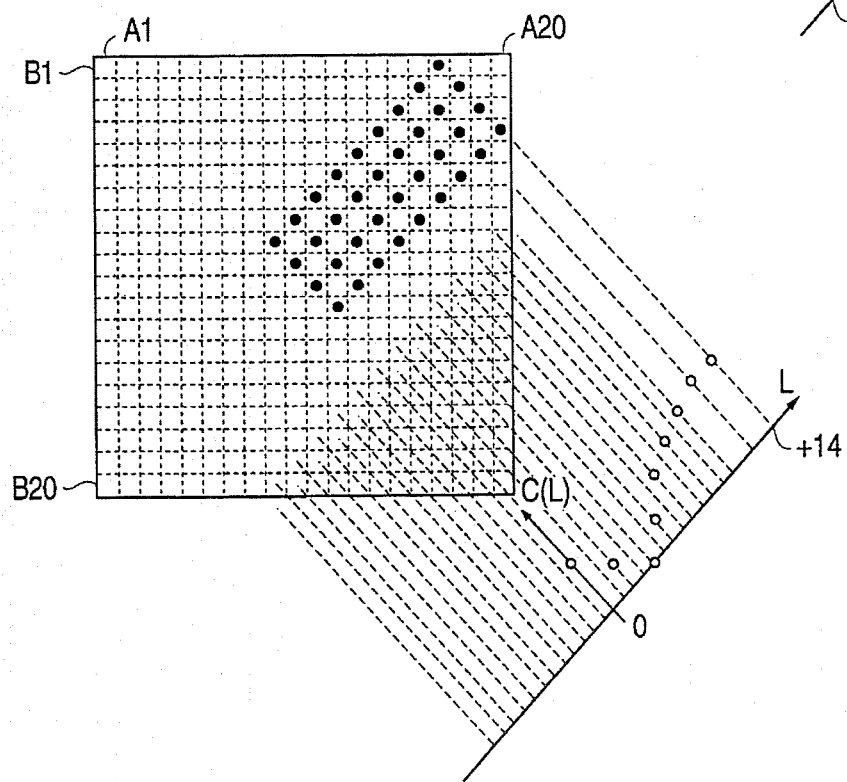
FIG. 19 is a diagram of a still further calculation process of a camera according to the fourth embodiment of the present invention.

In this embodiment, the shift amount L is restricted during scanning drive according to the direction of scanning drive. As illustrated in FIG. 19, the shift amount L is restricted to a range of 0 to +14 (in this case, the + sign side of the shift amount corresponds to a focus displacement amount in the scanning drive direction). In addition, the shift amount is made larger. The calculation is performed with the parameter i changing from j' to j'+3. By performing the calculation of the correlation amount C(L) in this manner, the accuracy of focus detection decreases. However, the gauge becomes small and the calculation time is thereby reduced.

The gauge of the second focus detection calculation process, as illustrated in FIG. 19, equals 9×4=36.

In the above description of the focus detection calculation, the subject image data Ai and Bi may be raw data of the output signal of image sensor 8, or may be raw data after being subjected to a filter process.

In summary, impossibility decision unit 12 can independently apply each of the above methods (1), (2), (3) or (4), or apply plural conditions. If one of the conditions is satisfied, impossibility decision unit 12 then determines that focus detection is impossible and generates a focus detection impossible signal.

Figure 20:
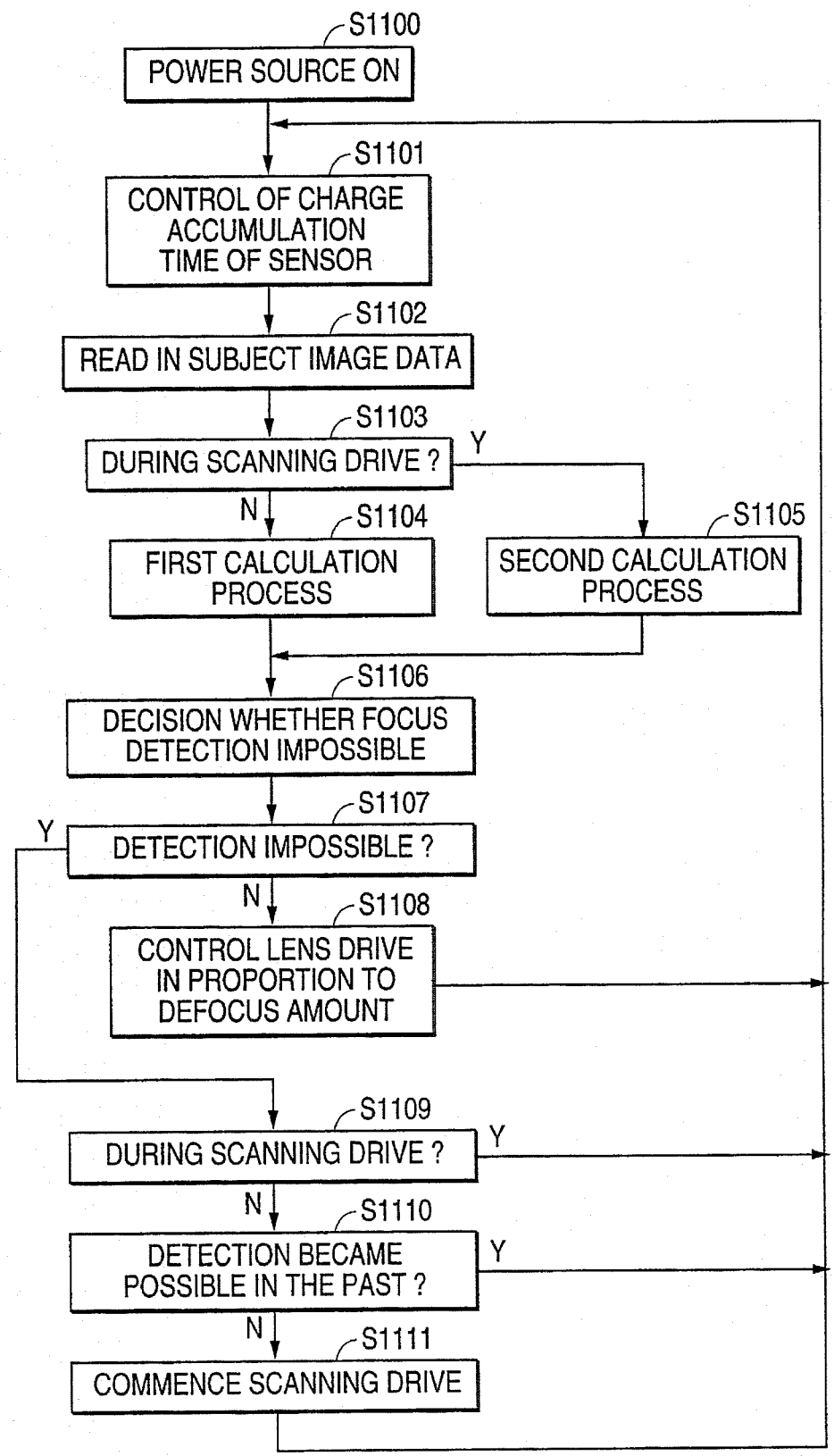
FIG. 20 is a flow chart of the processing sequence of a camera according to the fourth embodiment of the present invention.

FIG. 20 is a flow chart illustrating a processing sequence of microcomputer 16 according to an embodiment of the present invention. The process begins in step S1100 when the power source of the camera is turned ON. Then, in step S1101, a charge accumulation operation of image sensor 8 is performed. In step S1102, subject image data is read from image sensor 8 and, proceeding to step S1103, it is determined whether or not photographic optical system 3 is actually in scanning drive. If photographic optical system 3 is in scanning drive, the process moves to step S1105 and the defocus amount DEF is calculated for the subject image data, based on the above-mentioned second focus detection calculation process. If photographic optical system 3 is not in scanning drive, the process moves from step S1103 to step S1104 and the defocus amount DEF is calculated for the subject image data, based on the above-mentioned first focus detection calculation process.

In step S1106, a focus detection impossible decision is performed and, in step S1107, it is determined whether or not focus detection is impossible. In the case that focus detection is impossible, the process moves to step S1109; in the case that focus detection is possible, the process moves to step S1108. In step S108, the amount of drive of photographic optical system 3 is set, based on the calculated defocus amount DEF, and motor 17 drives photographic optical system 3 to the focused position. When the movement of photographic optical system 3 ends, the process returns to step S1101 and the abovementioned operations are repeated. Moreover, in step S1108, the process may be such as to return to step S1101 before ending the movement of photographic optical system 3. On the other hand, in the case that focus detection is impossible, in step S1109, it is determined whether photographic optical system 3 is in scanning drive or not. When photographic optical system 3 is in scanning drive in step S1109, the process returns to step S1101 and scanning drive remains unchanged. If photographic optical system 3 is not in scanning drive in step S1109, the process moves to step S1110 where it is determined whether focus detection became possible in the past. If focus detection became possible, the process returns to step S1101 without commencing scanning drive; if focus detection did not become possible, the process moves to step S1111 where scanning drive is commenced and the process thereafter returns to step S1101. In step S1110 the routine usually proceeds to step S111. In such a manner, scanning drive is inhibited once focus detection becomes possible and, therefore, scanning drive is not frequently performed. In the case that focus detection does not become possible even on performing scanning drive from a close end position to an infinity end position, scanning drive is ended.

Furthermore, according to the above embodiments of the present invention, the second focus detection calculation process is selected during scanning drive. However, if the subject luminosity is considered, a long charge accumulation time during scanning drive at low luminosity may be required. In this case, the second focus detection calculation process should be selected. Also, the first focus detection calculation process is selected other than during scanning drive. However, if the subject luminosity is considered, a long charge accumulation time during non-scanning drive may be required at low luminosity. In this case, the second focus detection calculation process should be selected.

In a camera according to the fourth embodiment of the present invention, a focus detection calculation unit 11 calculates the degree of correlation of a pair of subject image data signals output from image sensor 8. When impossibility decision unit 12 determines that the reliability of the focus detection result is high, photographic optical system 3 is driven in accordance with the detected focus adjustment state. Scanning drive is performed when impossibility decision unit 12 determines that (1) focus detection is impossible, or (2) even if focus detection is possible, that the reliability of the focus detection result is low.

In a camera according to the fourth embodiment of the present invention, during scanning drive, focus detection calculation unit 11 limits the amount of subject image data used in the calculation of the degree of correlation.

In a camera according to the fourth embodiment of the present invention, the camera can be designed so that only the central portion of the subject image data is used during scanning drive to calculate the degree of correlation. For example, image data represents a pattern which can be graphically represented as having a central portion and, during scanning, focus detection is performed in accordance with the image data corresponding to the central portion of the pattern. Moreover, during scanning drive, focus detection calculation unit 11 can calculate the degree of correlation by thinning out the subject image data. Also, during scanning drive, focus detection calculation unit 11 can calculate the degree of correlation making the relative shift amount of the pair of subject image data signals to be larger than during non-scanning. Alternatively, focus detection calculation unit 11 can calculate the degree of correlation by restricting the image data to a greater extent, as compared to the calculation during non-scanning. Furthermore, the focus detection calculation unit 11 can calculate the degree of correlation by making the relative shift amount of the subject image data to be greater as compared to the relative shift amount during non-scanning drive.

In a camera according to the fourth embodiment of the present invention, the gauge of the correlation calculation during scanning drive can be made smaller than the gauge during non-scanning drive. As a result, the correlation calculation time and the focus detection interval during scanning are reduced.

In a camera according to the fourth embodiment of the present invention, a focus detection calculation process is performed in which the gauge is smaller during scanning drive as compared to the gauge of the focus detection calculation process when the photographic optical system is not scanning (that is, during a "normal" time). As a result, the focus detection calculation time and the focus detection interval are reduced and the focus position can be obtained during scanning drive. Moreover, scanning drive can be performed at a higher speed as compared to the prior art. Also, a camera according to the fourth embodiment of the present invention can determine a focus position of a fading subject since the focus detection interval is reduced. Such a determination is impossible with prior art cameras. Furthermore, if focus detection becomes impossible during scanning drive for a subject of low contrast, the time from the commencement of scanning drive to the end of scanning drive is short in a camera according to the fourth embodiment of the present invention. Thus, a long time delay will not occur. Long time delays of prior art cameras tend to irritate a photographer.

In a camera according to the fourth embodiment of the present invention, a pair of subject image data from image sensor 8 is transformed according to the luminous intensity of the light received from the pair of subject images. A focus adjustment state of photographic optical system 3 is detected by calculating the degree of correlation while relatively shifting the pair of subject image data. Then, when the reliability of this detection result of the focus adjustment state is high, photographic optical system 3 is driven, based on the detected focus adjustment state; when detection is impossible, or the reliability of the detection result is low, a scanning drive of photographic optical system 3 is performed and the degree of correlation is calculated in accordance with an amount of subject image data which is restricted to be smaller than during non-scanning drive. Focus detection of photographic optical system 3 is then performed. In this manner, the gauge of the correlation calculation during scanning drive can be made smaller than the gauge during non-scanning drive to reduce the correlation calculation time. Therefore, the focus detection interval during scanning drive is reduced. In addition, even in the case that the subject is outside the subject frame, the subject can be reliably detected.

Moreover, according to embodiments of the present invention, when the reliability of the focus adjustment state is high, photographic optical system 3 is driven, based on the detected focus adjustment state. When detection of the focus adjustment state is impossible, or the reliability of the detection result is low, a scanning drive of photographic optical system 3 is performed. Focus detection is performed by calculating the degree of correlation, using a larger relative shift amount of the pair of subject images than during non-scanning drive. In this manner, the gauge of the correlation calculation process during scanning drive can be made smaller than the gauge during non-scanning drive. By reducing the correlation calculation time, the focus detection interval during scanning drive can also be reduced.

In a camera according to the fourth embodiment of the present invention, scanning drive is not performed after a focus adjustment state of high reliability is obtained.

FIFTH EMBODIMENT

Figure 21:
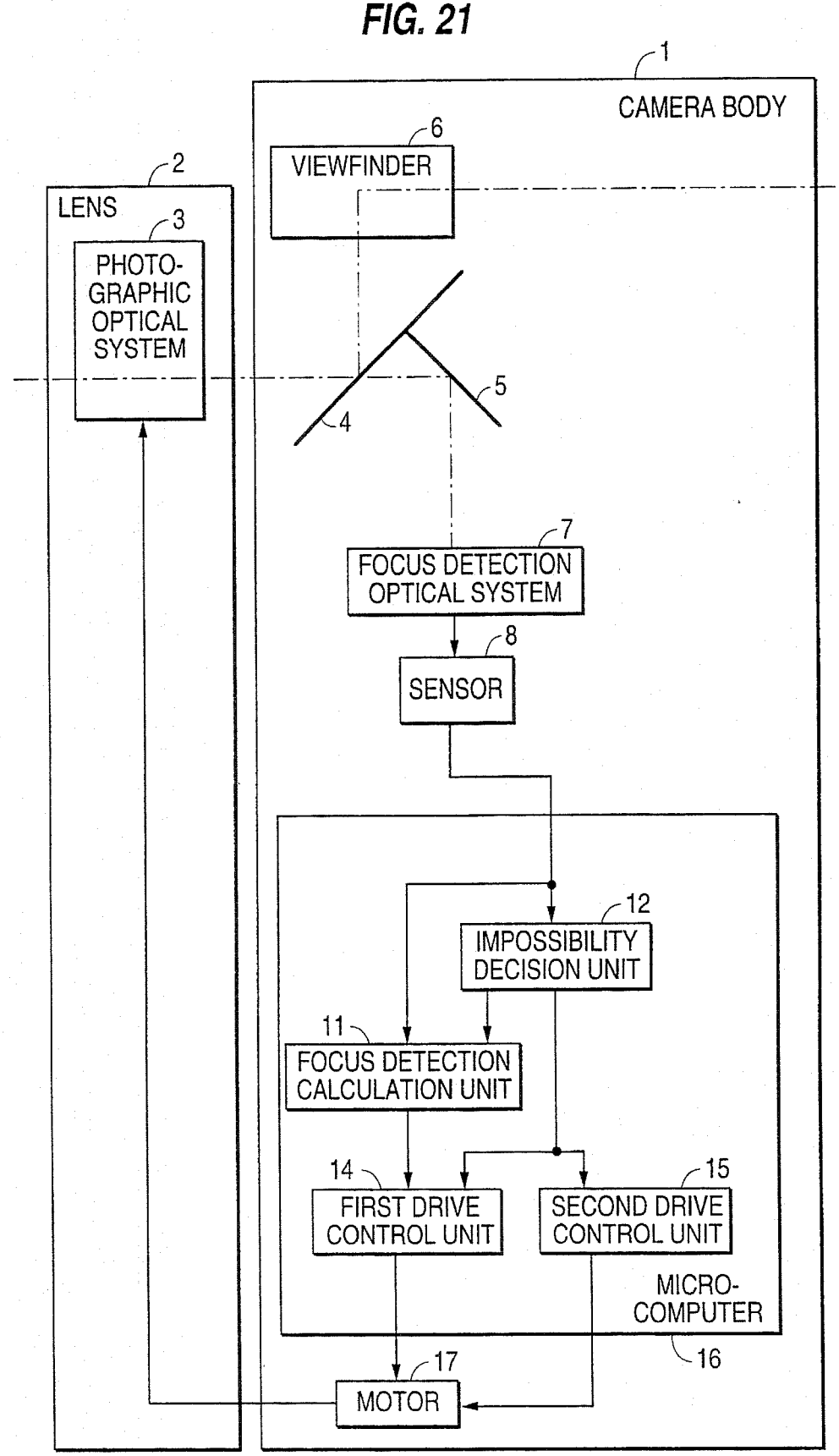
FIG. 21 is a block diagram illustrating a camera according to a fifth embodiment of the present invention.

FIG. 21 is a block diagram illustrating a camera according to a fifth embodiment of the present invention. Similar reference numerals in FIG. 21 to other figures represent similar elements or functions. Since FIG. 21 is very similar to other figures (for example, see FIG. 2), differences between the figures will be explained. In FIG. 21, microcomputer 16 operates as a control unit and comprises focus detection calculation unit 11, impossibility decision unit 12, first drive control unit 14, and second drive control unit 15. Impossibility decision unit 12 inputs subject image data directly from image sensor 8. The focus detection impossible decision is performed before a focus detection calculation process is performed by focus detection calculation unit 11. In this manner, a focus detection calculation is only performed when the camera is not in scanning drive. Since a focus detection calculation is not performed when focus detection is impossible, the calculation time can be reduced and the focus point can be obtained during scanning drive.

The calculation process of a focus detection impossible decision during scanning drive is performed according to Equation 7. In this case, the gauge of the calculation process (that is, the number of calculations which take the absolute value of a difference) equals 19.

Figure 22:
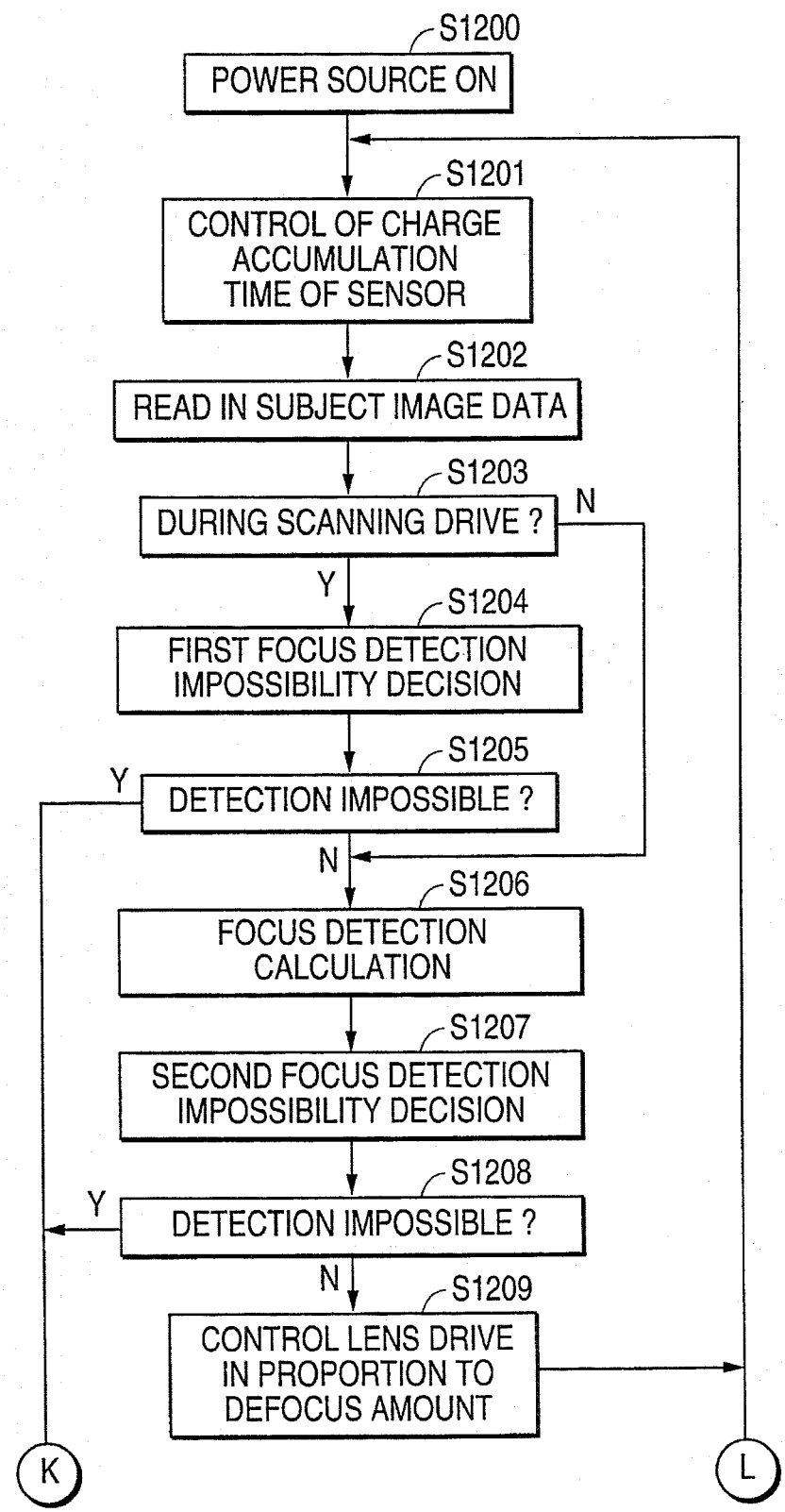
FIG. 22 is a flow chart illustrating a processing sequence of a camera according to the fifth embodiment of the present invention.
Figure 23:
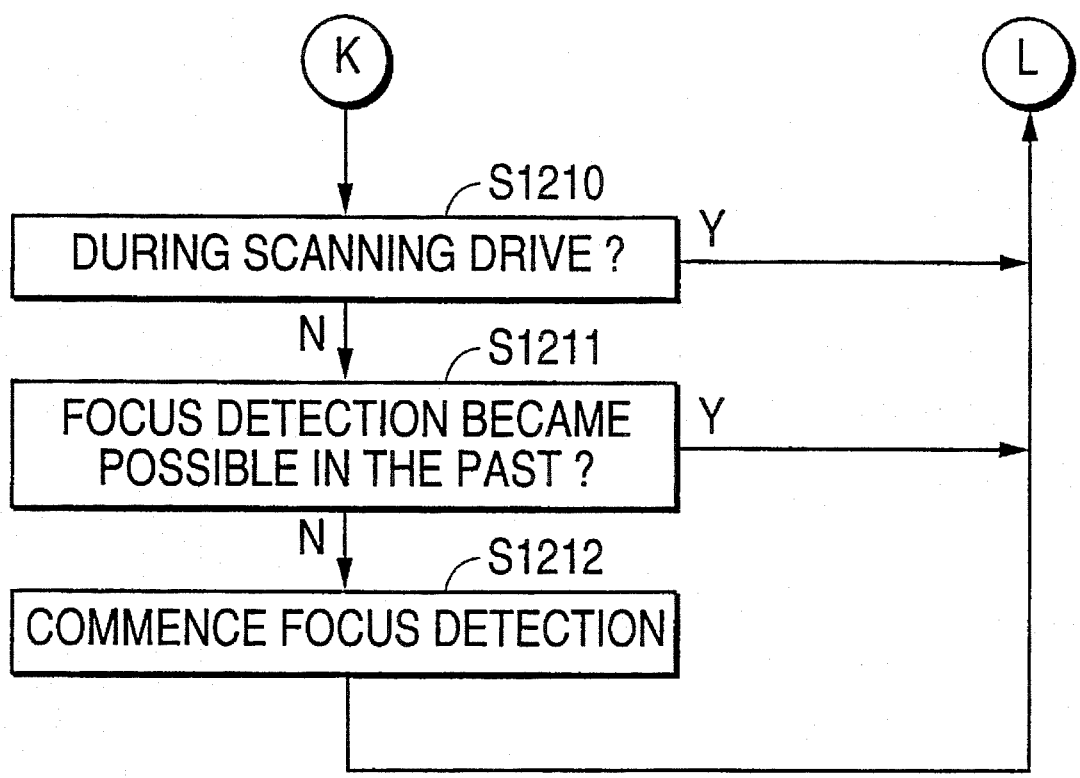
FIG. 23 is a continuation of the flow chart illustrated in FIG. 22.

FIGS. 22 and 23 are flow charts which indicate a processing sequence of microcomputer 16 according to the fifth embodiment of the present invention. The process begins in step S1200 when the power source of the camera is turned ON. Then, in step S1201, a charge accumulation operation of the image sensor 8 is performed. In step S1202, subject image data is read from image sensor 8 and, in step S1203, it is determined whether or not photographic optical system 3 is actually in scanning drive. If photographic optical system 3 is in scanning drive, the process moves to step S1204; if photographic optical system 3 is not in scanning drive, the process moves to step S1206. When in scanning drive in step S1204, the contrast of the subject image data is detected, based on the abovementioned Equation 7 and a first focus detection impossibility decision is performed. Then, in step S1205, the result of the first focus detection impossibility decision is analyzed and, in the case that focus detection is impossible, the process moves to step S1210. In the case that focus detection is possible in step S1205, scanning drive is stopped and the process moves to step S1206.

In step S1206, the camera is not in scanning drive and the defocus amount DEF is calculated by previously described first focus detection calculation process. Further, in step S1207, a second focus detection impossibility decision is performed, based on the correlation calculation result. In step S1208, the result of the second focus detection impossibility decision is determined. In the case that focus detection is impossible, the process moves to step S1210 and, in the case that focus detection is possible, the process moves to step S1209. The first focus detection impossibility decision and the second focus detection impossibility decision represent a focus detection impossibility decision as previously described for the first, second, third and fourth embodiments of the present invention. In step S1209, the amount of drive of the photographic optical system 3 is set, based on the calculated defocus amount DEF and motor 17 is controlled to drive photographic optical system 3 to the focus position. When the movement of photographic optical system 3 ends, the process moves to step S1201 and the abovementioned operations are repeated. Moreover, in step S1209, the routine may be such as to return to step S1201 before ending the movement of photographic optical system 3.

On the other hand, if it is determined in the first focus impossibility decision (step S1205) or the second focus impossibility decision (S1208) that focus detection is impossible, the process moves to step S1210 where it is determined whether photographic optical system 3 is in scanning drive or not. When photographic optical system 3 is in scanning drive in step S1210, the process returns to step S1201 with scanning drive, continuing unchanged. If photographic optical system 3 is not in scanning drive in step S1210, the process moves to step 211. In step S211, the process moves to step S1211 where it is determined whether focus detection has become possible. If focus detection became possible in step S1211, the process returns to step S1201 without commencing scanning drive. If focus detection did not become possible in step S1211, the process moves to step S1212 where scanning drive is commenced and, thereafter, the process returns to step S1201. In step S1211 the routine usually proceeds to step S1212. In the above manner, scanning drive is inhibited once focus detection becomes possible and, as a result, scanning drive is not frequently performed.

Moreover, in the case that focus detection does not become possible even after performing scanning drive from a close end position to an infinity end position, scanning drive ends.

In a camera according to above embodiments of the present invention, when it is determined that focus detection is "impossible", scanning drive is performed and different image sensors or image sensor output signals are used for focus detection, as opposed to when focus detection is possible (or not "impossible"). Focus detection can be determined to be "impossible" when either (a) focus detection is impossible as previously described and/or (b) even if focus detection is impossible, reliability of the focus detection result is low. Of course, whether focus detection is "impossible" can be tailored to a specific camera or a specific application based on required thresholds for the specific camera or application. Therefore, the level of focus detection can be compared to a predetermined threshold and, for example, focus detection can be determined to be "impossible" if the level of focus detection is below the predetermined threshold.

Although a few preferred embodiments of the invention have been shown and described, it would be appreciated by those skilled in the art that changes may be made in these embodiments, without departing from the principles and the spirit of the invention, the scope of which is defined in the appended claims and their equivalents.

What is claimed is:

1. A camera which performs focus detection to detect a focus position, the camera comprising:
   a photographic lens which is adjustable from a close end position to an infinity end position to obtain a respective focus position corresponding to a subject to be photographed;
   first and second image sensors, each image sensor receiving light from the subject which passes through the photographic lens, forming a respective image of the subject, and producing a sensor output which corresponds to the luminous intensity distribution of the received light, each image sensor having a specific sensitivity and the sensitivity of the second image sensor being higher than the sensitivity of the first image sensor; and
   a control unit which
      determines, based on the sensor output of one of the first and second image sensors, whether focus detection is possible,
      causes the photographic lens to scan from the close end position to the infinity end position when focus detection is not possible, and
      performs focus detection based on the output of the second image sensor when the photographic lens is scanning.

2. A camera as in claim 1, wherein the control unit comprises:
   a focus detection unit which determines the possibility of focus detection based on the sensor output of one of the first and second image sensors, and produces a corresponding output signal; and
   a drive unit which drives the photographic lens in accordance with the output signal of the focus detection unit.

3. A camera as in claim 1, further comprising a focus detection optical system which comprises:
   a first focus detection optical system which receives light from the subject passing through the photographic lens and forms an image on the first image sensor; and
   a second focus detection optical system which receives light from the subject passing through the photographic lens and forms an image on the second image sensor.

4. A camera as in claim 3, wherein the first focus detection optical system and the second focus detection optical system have mutually different optical characteristics.

5. A camera as in claim 1, wherein the second image sensor comprises a plurality of charge accumulation type photoelectric conversion elements and accumulates a greater amount of charge than the first image sensor when the first image sensor and the second image sensor both receive the same luminous intensity distribution of light from the same subject at the same time.

6. A camera as in claim 1, wherein, when the control unit determines that focus detection is possible, the control unit prevents the photographic lens from scanning and prevents the sensor output of the second image sensor from being used to perform focus detection.

7. A camera as in claim 2, wherein, when the control unit determines that adjustment of the photographic lens is possible and that adjustment would be reliable, the control unit prevents the photographic lens from scanning and prevents the sensor output of the second image sensor from being used to perform focus detection.

8. A camera which performs focus detection to detect a focus position, the camera comprising:
   a photographic lens which is adjustable from a close end position to an infinity end position to obtain a respective focus position corresponding to a subject to be photographed;
   a plurality of image sensors, each image sensor receiving light from the subject which passes through the photographic lens, forming a respective image of the subject, and producing a sensor output which corresponds to the luminous intensity distribution of the received light; and
   a control unit which
      determines, based on the sensor output of at least one image sensor of the plurality of image sensors, whether focus detection is possible,
      causes the photographic lens to scan from the close end position to the infinity end position when focus detection is not possible, and
      selects a respective image sensor of the plurality of image sensors and performs focus detection based on the output of the selected image sensor when the photographic lens is scanning.

9. A camera as in claim 8, wherein the control unit performs focus detection based on the output of each of the plurality of image sensors when focus detection is possible.

10. A camera as in claim 8, further comprising a plurality of focus detection optical systems which correspond, respectively, to the plurality of image sensors, each focus detection optical system receiving light from the subject passing through the photographic lens and forming an image on the corresponding image sensor.

11. A camera as in claim 8, wherein each image sensor comprises a plurality of charge accumulation type photoelectric conversion elements.

12. A camera as in claim 10, wherein the camera detects focus in a plurality of focus detection regions and a portion of each focus detection region mutually overlap, and the plurality focus detection optical systems correspond, respectively, to the plurality of focus detection regions.

13. A camera as in claim 10, wherein the camera detects focus in a plurality of focus detection regions located on a photographic picture plane, the photographic picture plane having a center and a circumference, one of the plurality of focus detection regions being located at the center of the photographic picture plane and a different focus detection region being located at the circumference of the photographic picture plane.

14. A camera which performs focus detection to detect a focus position, the camera comprising:
   a photographic lens which is adjustable from a close end position to an infinity end position to obtain a respective focus position corresponding to a subject to be photographed;

an image sensor which receives light from the subject which passes through the photographic lens, forms a respective image of the subject, and produces a sensor output which corresponds to the luminous intensity distribution of the received light; and a control unit which determines, based on the sensor output, whether focus detection is possible, causes the photographic lens to scan from the close end position to the infinity end position when focus detection is not possible, amplifies the sensor output by a first gain and performs focus detection based on the first gain amplified sensor output when focus detection is possible, and amplifies the sensor output by a second gain and performs focus detection based on the second gain amplified sensor output when focus detection is not possible, the second gain being greater than the first gain.

15. A camera which performs focus detection to detect a focus position, the camera comprising:

a photographic lens which is adjustable from a close end position to an infinity end position to obtain a respective focus position corresponding to a subject to be photographed;

an image sensor which receives light from the subject which passes through the photographic lens, forms a respective image of the subject, and produces a sensor output which corresponds to the luminous intensity distribution of the received light; and a control unit which determines, based on the sensor output of the image sensor, whether focus detection is possible, causes the photographic lens to scan from the close end position to the infinity end position when focus detection is not possible, and amplifies the sensor output and performs focus detection based on the amplified sensor output when the photographic lens is scanning, wherein the control unit performs focus detection based on the sensor output, without amplifying the sensor output, when focus detection is possible.

16. A camera which performs focus detection to detect a focus position, the camera comprising:

a photographic lens which is adjustable from a close end position to an infinity end position to obtain a respective focus position corresponding to a subject to be photographed;

an image sensor which receives light from the subject which passes through the photographic lens, forms a respective image of the subject, and produces a sensor output which corresponds to the luminous intensity distribution of the received light; and a control unit which determines, based on the sensor output of the image sensor, whether focus detection is possible, causes the photographic lens to scan from the close end position to the infinity end position when focus detection is not possible, and amplifies the sensor output and performs focus detection based on the amplified sensor output when the photographic lens is scanning, wherein, when the control unit determines that focus detection is possible, the control unit prevents the photographic lens from scanning and does not use an amplified sensor output to perform focus detection.

* * * * *